(12) United States Patent
Maguire et al.

(10) Patent No.: US 10,861,071 B2
(45) Date of Patent: Dec. 8, 2020

(54) CROWD-SOURCED COMPUTER-IMPLEMENTED METHODS AND SYSTEMS OF COLLECTING REQUESTED DATA

(71) Applicant: Knowmadics, Inc., Herndon, VA (US)

(72) Inventors: Paul Maguire, Manassas, VA (US); Lisa Cinnamon, Hammonds Plain (CA); Claire Ostrum, Leesburg, VA (US); Steven Edgett, Kanata (CA); Charles Corcoran, Duluth, GA (US)

(73) Assignee: KNOWMADICS, INC., Herndon, VA (US)

( * ) Notice: Subject to any disclaimer, the term of this patent is extended or adjusted under 35 U.S.C. 154(b) by 756 days.

(21) Appl. No.: 14/620,491

(22) Filed: Feb. 12, 2015

(65) Prior Publication Data
US 2015/0227999 A1    Aug. 13, 2015

Related U.S. Application Data

(60) Provisional application No. 61/938,812, filed on Feb. 12, 2014.

(51) Int. Cl.
*G06Q 10/00* (2012.01)
*G06Q 30/06* (2012.01)
*G06Q 50/00* (2012.01)

(52) U.S. Cl.
CPC ......... *G06Q 30/0611* (2013.01); *G06Q 50/01* (2013.01)

(58) Field of Classification Search
None
See application file for complete search history.

(56) References Cited

U.S. PATENT DOCUMENTS

| | | |
|---|---|---|
| 6,839,552 B1 | 1/2005 | Martin |
| 7,406,507 B2 | 7/2008 | Piccioni |
| 7,860,222 B1 | 12/2010 | Sidler et al. |
| 7,873,349 B1 | 1/2011 | Smith |
| 7,924,149 B2 | 4/2011 | Mendelson |

(Continued)

OTHER PUBLICATIONS

In-Vehicle Display Icons and Other Information Elements: Literature Review, May 1998, U.S. Department of Transportation, Publication No. FHWA-RD-98-164, p. 1-50.*

(Continued)

*Primary Examiner* — Joseph M Waesco
(74) *Attorney, Agent, or Firm* — Nixon & Vanderhye PC

(57) ABSTRACT

The present invention broadly comprises crowd-sourced computer-implemented methods and systems of collecting requested data. One embodiment of the invention may be implemented as an electronic device including a request creating unit, a transmitter, and a receiver. The request creating unit is configured to create a request. The transmitter is configured to transmit the request for data to a plurality of collecting devices, to transmit an acceptance message to at least one of the plurality of collecting devices, and to transmit payment to each of the plurality of collecting devices to which the acceptance message was sent. The receiver is configured to receive bids from each of the plurality of collecting devices as proposed payment for collecting the data, and to receive the data from each of the plurality of collecting devices.

27 Claims, 20 Drawing Sheets

(56) References Cited

U.S. PATENT DOCUMENTS

| | | | |
|---|---|---|---|
| 8,024,330 B1 | 9/2011 | Franco et al. | |
| 8,165,560 B2 | 4/2012 | Stenquist | |
| 8,265,597 B2 | 9/2012 | Smith | |
| 8,311,515 B1 | 11/2012 | Smith | |
| 8,457,596 B2 | 6/2013 | Smith | |
| 8,583,448 B1* | 11/2013 | Harrison, Jr. | G06Q 30/02 705/1.1 |
| 8,606,230 B2 | 12/2013 | Smith | |
| 8,639,650 B1* | 1/2014 | Gill | G06F 16/285 706/61 |
| 9,000,933 B2 | 4/2015 | Ray et al. | |
| 9,014,660 B2 | 4/2015 | Pahlevani | |
| 9,294,900 B2 | 3/2016 | Pahlevani | |
| 9,712,576 B1* | 7/2017 | Gill | G06F 3/04817 |
| 9,807,183 B2 | 10/2017 | Maguire et al. | |
| 2005/0085257 A1 | 4/2005 | Laird | |
| 2006/0015254 A1 | 1/2006 | Smith | |
| 2007/0294177 A1 | 12/2007 | Volk | |
| 2008/0068130 A1 | 3/2008 | Batta | |
| 2008/0189162 A1 | 8/2008 | Ganong | |
| 2009/0005068 A1 | 1/2009 | Forstall | |
| 2009/0281850 A1 | 11/2009 | Bruce | |
| 2009/0326381 A1 | 12/2009 | Yuan | |
| 2010/0324936 A1* | 12/2010 | Vishnubhatla | G06Q 50/24 705/3 |
| 2011/0130636 A1 | 6/2011 | Daniel et al. | |
| 2011/0225198 A1 | 9/2011 | Edwards et al. | |
| 2011/0319051 A1 | 12/2011 | Reitnour | |
| 2013/0046847 A1* | 2/2013 | Zavesky | H04W 4/029 709/217 |
| 2013/0084882 A1* | 4/2013 | Khorashadi | H04W 4/021 455/456.1 |
| 2013/0088615 A1* | 4/2013 | Altieri | H04N 5/225 348/231.3 |
| 2013/0124244 A1* | 5/2013 | Johnson | G06Q 10/0631 705/7.12 |
| 2013/0157612 A1 | 6/2013 | Cordero | |
| 2013/0159330 A1* | 6/2013 | Smith | G06Q 50/01 707/758 |
| 2013/0183924 A1 | 7/2013 | Saigh | |
| 2013/0231851 A1* | 9/2013 | Chen | G08G 1/0141 701/119 |
| 2014/0099998 A1 | 4/2014 | Smith | |
| 2014/0253319 A1* | 9/2014 | Chang | H04M 1/72522 340/521 |
| 2014/0278850 A1* | 9/2014 | Boccuzzi, Jr. | G06Q 30/0208 705/14.11 |
| 2014/0372160 A1* | 12/2014 | Nath | G06Q 10/06311 705/7.13 |
| 2015/0052485 A1 | 2/2015 | Grounds | |
| 2015/0163312 A1* | 6/2015 | Maguire | G16H 50/80 709/219 |
| 2015/0227999 A1* | 8/2015 | Maguire | G06Q 30/0611 705/80 |
| 2015/0256423 A1* | 9/2015 | Stearns | H04L 43/045 709/224 |
| 2016/0072918 A1* | 3/2016 | Gabrelyanov | H04L 67/06 709/219 |
| 2016/0183074 A1 | 6/2016 | Pahlevani | |

OTHER PUBLICATIONS

MaGuire et al., Office Action dated Oct. 24, 2016 issued in related U.S. Appl. No. 14/561,564 (12 pages).

Stach, et al., "Candy Castle, A Prototype for Pervasive Health Games" PerCom Demos, 2012, Lugano (Mar. 20, 2012) (pp. 501-503).

File history of the Re-Examination of U.S. Pat. No. 8,265,597—Reexamination Control No. 90/013,020 filed on Oct. 8, 2013.

Mobile Phones as Computing Devices: "The Viruses are Coming!" by David Dagon, Tom Martin, and Thad Stamer, published in *Pervasive Computing*, published by the IEEE CS and IEEE ComSoc, 2004.

"How to Tell If Your Cell Phone Is Bugged" by Lauren Weinstein (Vortex Technology), published as http://lauren.vortex.com/archive/000202.html; Dated Dec. 3, 2006.

"FlexiSPY PRO-X, FLEXISPY" [online], published Apr. 24, 2008 [retrieved on Sep. 2, 2013]. Retrieved from the Intenet:<URL: http://wayback.archive.org/web/20080409170704/http://www.flexispy.com/faq.htrn#03.> (and linked pages).

"*Fake Shutdown* 1.0", NONAGS [online] published Nov. 12, 2001 [retrieved on Sep. 6, 2013]. Retrieved from the internet <URL: http://www.nonags.com/freeware-fake-shutdown 969.html.

"Stealthy Video Capturer: A New Video-based Spyware in 3G Smartphones" by Nan Xu et. al., Source: Proceedings of the Second ACM Conference on Wireless Network Security, pp. 69-78, 2009.

FBI Taps Cell Phonemic As Eavesdropping Tool; by Declan McCullagh; Conet News, Source: http://news.cnet.com/2100-1029-6140191.html; Dated Dec. 1, 2006.

* cited by examiner

CHAMPS ECOSYSTEM 20 www.champs.com/tasks/images

| I/V/T/A - Location - Time of Day - | Resolution/Quality - | Delivery Date - | NTE Bid amount |
|---|---|---|---|
| ○ Imagery - Washington Monument at Dawn | 1024x768 | 2/7/14 | $2.00 per image |
| ○ Audio - San Fran Trolley Car | 256/kps | 5/7/14 | $2.00 per image |
| ○ Video - Orioles Stadium | HD | 4/9/14 | $2.00 per minute |
| ○ Imagery - 1956 Corvette Red | 1024x768 | 2/7/14 | $4.00 per image |

Home Screen — 1310

Event Category — 1320

Report Screen — 1330

- SilverEye allows you to import the CASES data and to map it like any other sensor

- SilverEye integrates the CASES data with other sensor feeds

CROWD-SOURCED COMPUTER-IMPLEMENTED METHODS AND SYSTEMS OF COLLECTING REQUESTED DATA

CROSS-REFERENCE TO RELATED APPLICATIONS

This application claims priority under 35 U.S.C. § 119(e) to U.S. Application No. 61/938,812, filed Feb. 12, 2014. This application is related to U.S. Application No. 61/912,337, filed Dec. 5, 2013, U.S. Application No. 61/912,944, filed Dec. 6, 2013, U.S. Application No. 61/914,755, filed Dec. 11, 2013, and U.S. application Ser. No. 14/561,564, filed Dec. 5, 2014. The entire content of all of these documents is incorporated into the present application by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

Aspects of the present disclosure relate to tasking and collecting crowd sourced data.

BACKGROUND OF THE INVENTION

Conventional systems in many cases require other specialized pieces of hardware in addition to a portable device and/or require a person in the loop that makes judgments about the data being collected or received. For this system we propose a marketplace that facilitates commercial transactions centered around tasking by an individual, agency, and/or corporation for the purposes of knowledge generation from individuals, agencies, and/or corporations who have access and/or ownership of generally available collection technologies—mobile handsets, cameras, audio recording devices, satellites, etc.

In contrast, products like Mechanical Turk are more focused on people exploiting collections that have already occurred rather than bidding to accomplish new tasks. Further, sites like ScoopShot do not do anything other than solicit image collections events without any amplifying information. This site also uses pre-set pricing rather than a bid environment.

SUMMARY OF THE INVENTION

The present invention broadly comprises crowd-sourced computer-implemented methods and systems of collecting requested data. One embodiment of the invention may be implemented as an electronic device including a request creating unit, a transmitter, and a receiver. The request creating unit is configured to create a request. The transmitter is configured to transmit the request for data to a plurality of collecting devices, to transmit an acceptance message to at least one of the plurality of collecting devices, and to transmit payment to each of the plurality of collecting devices to which the acceptance message was sent. The receiver is configured to receive bids from each of the plurality of collecting devices as proposed payment for collecting the data, and to receive the data from each of the plurality of collecting devices.

Another aspect may be embodied as an electronic device including a sensor, a receiver, and a transmitter. The sensor is configured to collect data. The receiver is configured to receive a request for data from a tasking device, to receive an acceptance message from the tasking device, and to receive payment from the tasking device. The transmitter is configured to transmit a bid to the tasking device as proposed payment for collecting the data, and to transmit the data collected by the sensor to the tasking device.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 3 is a table showing exemplary bids according to an embodiment of the present invention;

FIGS. 4-7 are exemplary screen shots of a display of a device according to an embodiment of the present invention;

FIGS. 10 and 11 illustrate exemplary screen shots for a client device which may be part of the exemplary systems shown in FIGS. 8 and 9;

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

One aspect of the present invention would provide an open marketplace that would connect knowledge seekers with knowledge collectors. The knowledge seekers could be individuals, agencies, and/or corporations. The knowledge providers could be a combination of individuals, agencies, and/or corporations. The "knowledge" could be previously collected artifacts—imagery, video, audio, observations, etc. as well as new specifically collected artifacts designed to fulfill a specified knowledge gap. The marketplace would support technical collection (direct control or tasking of collection devices remotely, as well as tasking that can be accomplished by personnel equipped with a computer program (e.g., a smartphone app) that resides on a collector's wireless portable computing device (e.g., smartphone), where the program allows selectable wireless transmission of a known and/or anonymous user's geographic location coordinates, audio, video, voice, text, temperature, velocity, or altitude (or any other sensed data available on the portable device) back to the tasking system, which manages and transforms the collected data into finished products.

Figure 1:
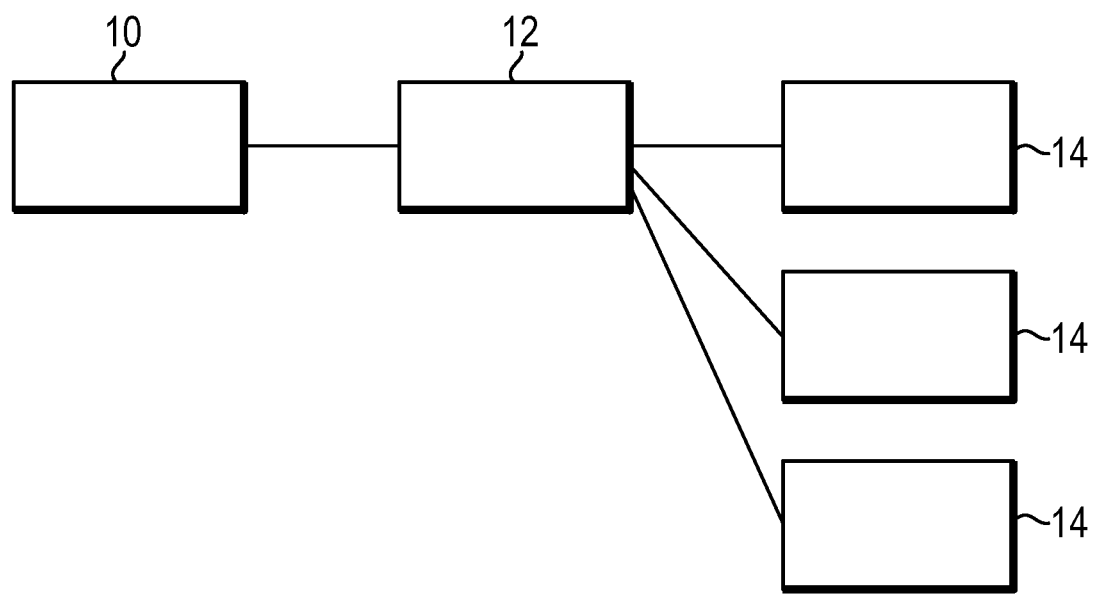
FIG. 1 is a diagram of the structure of a system according to a first exemplary embodiment of the present invention.

An exemplary system is shown in FIG. 1. Tasking device 10 is connected to network 12, which is connected to collecting devices 14. Tasking device 10 and collecting devices 14 may be any kind of electronic device that can collect, transmit, and receive data, such as a laptop or desktop computer, a tablet, a digital camera, or a smart phone. Network 12 may be the internet, a cellular phone system, or any other network that can connect the devices. Network 12 may also include a server running a collection function called CHAMPS (Crowd-Sourced Handeled Acquisition Market Place System) described herein. The server may be a cloud base server.

Figure 20:
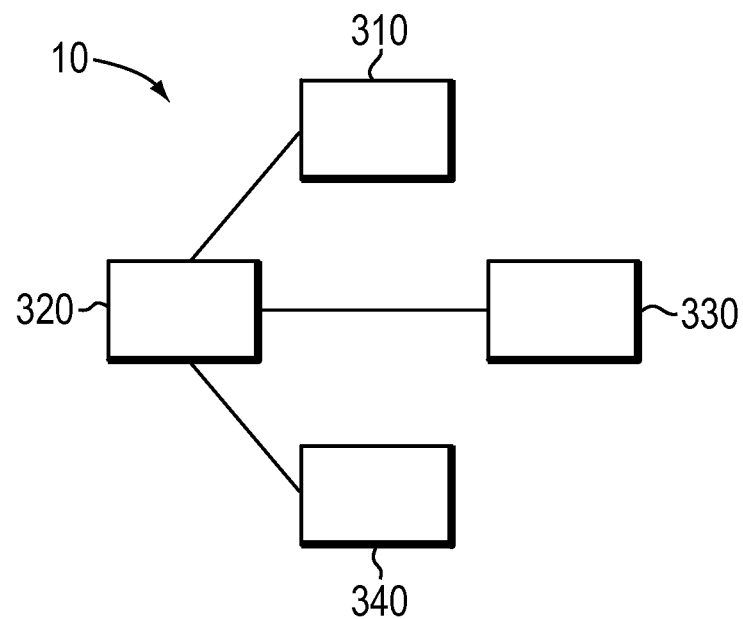
FIG. 20 shows exemplary tasker and collection devices.
Figure 20:
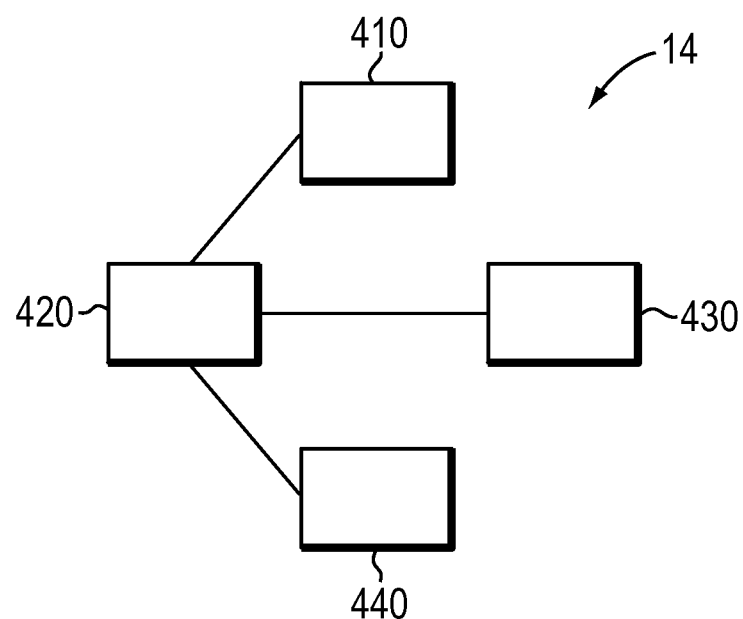

In an exemplary embodiment, devices 10 and 14 are smartphones running an application ("app") that interfaces with the CHAMPS system. FIG. 20 shows exemplary devices 10 and 14. Device 10 includes a processor 320 that is programmed with an app to perform the tasker functions described herein. Display 310 can display still and video images. Input/output devices 330 include at least one interface such as a keyboard or mouse for user input, and a speaker for audio output. Transmitter/receiver 340 transmits data to and receives data from other devices such as network 120. Device 14 includes a processor 420 that is programmed with an app to perform the collector functions described herein. Display 410 can display still and video images. Input/output devices 430 include at least one sensor or interface for collecting data such as a video camera, microphone, thermometer, GPS location detector, or keyboard. Transmitter/receiver 440 transmits data to and receives data from other devices such as network 120. In one embodiment, a single app is programmed with all tasker and collector functions so that a user can use a single device as both a tasker and collector device (for different tasks).

A collector who uses the app to collect can create a report on smartphone 14 to upload to the CHAMPS system. The report can include a text summary of the collect the user wishes to submit, and audio/video/photo attachments. The user identifies the type of collect (audio, video, imagery, weather, etc.), and the collect, attachments are uploaded to the CHAMPS system, with the option to retain a copy of the collect or to transmit without storing any data on the user's smartphone. Multiple collectors (the crowd) collecting the same incident/event can upload collections and sensor data to the CHAMPS system.

Thus, in one embodiment, CHAMPS is a web-based market place that allows corporations, governments, and private individuals—called "taskers"—to task the collection of information (audio, video, imagery, text, location, temperature, observation, and other data) anywhere in the world. In one embodiment, this can also be accomplished by using the CASES and/or CASES Agent app descried hereafter with respect to FIGS. 8-19. In other embodiments, the CHAMPS system may be independent from the CASES system.

Figure 2:
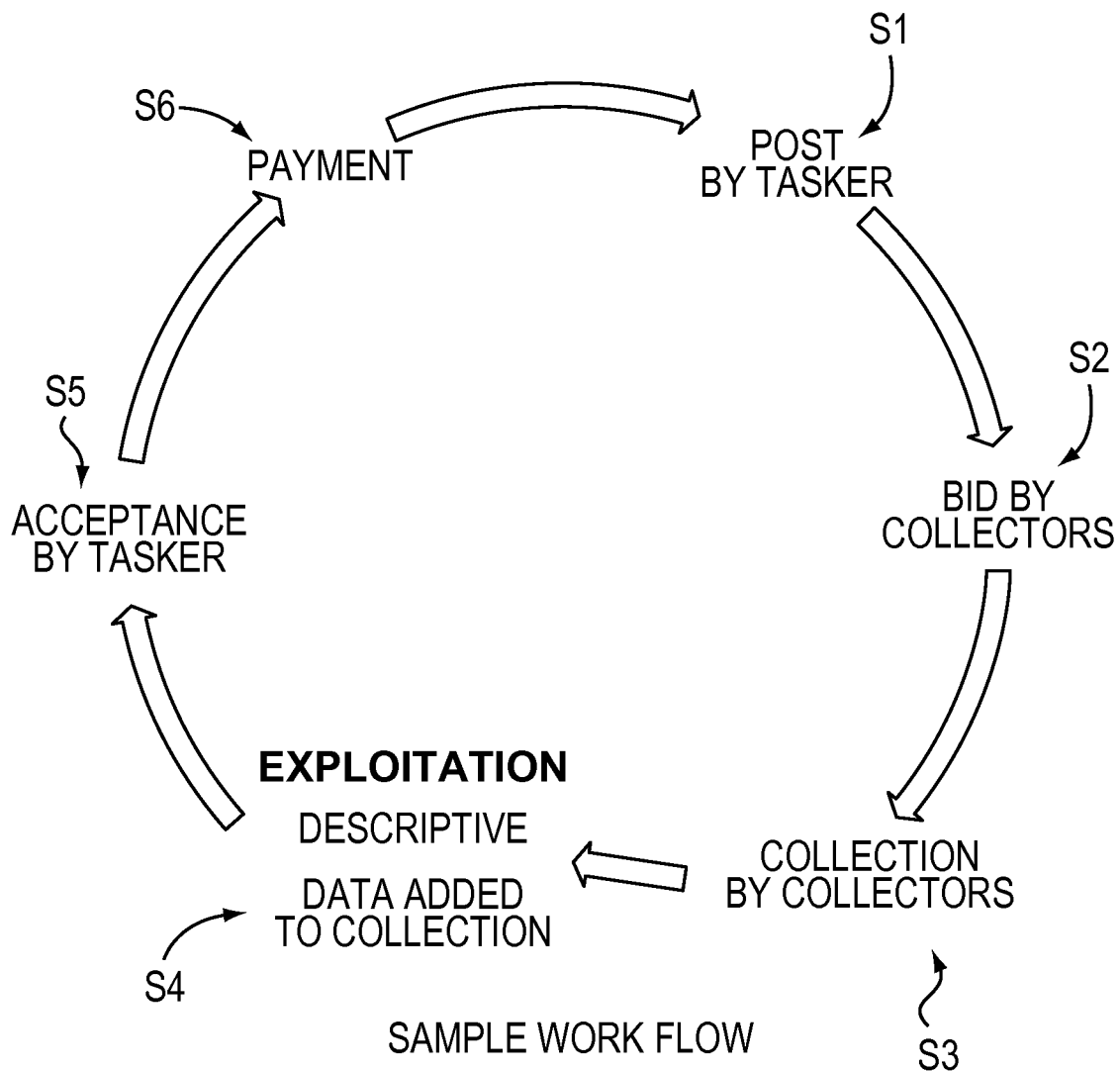
FIG. 2 is a diagram of an exemplary process of an embodiment of the present invention.
Figure 5:
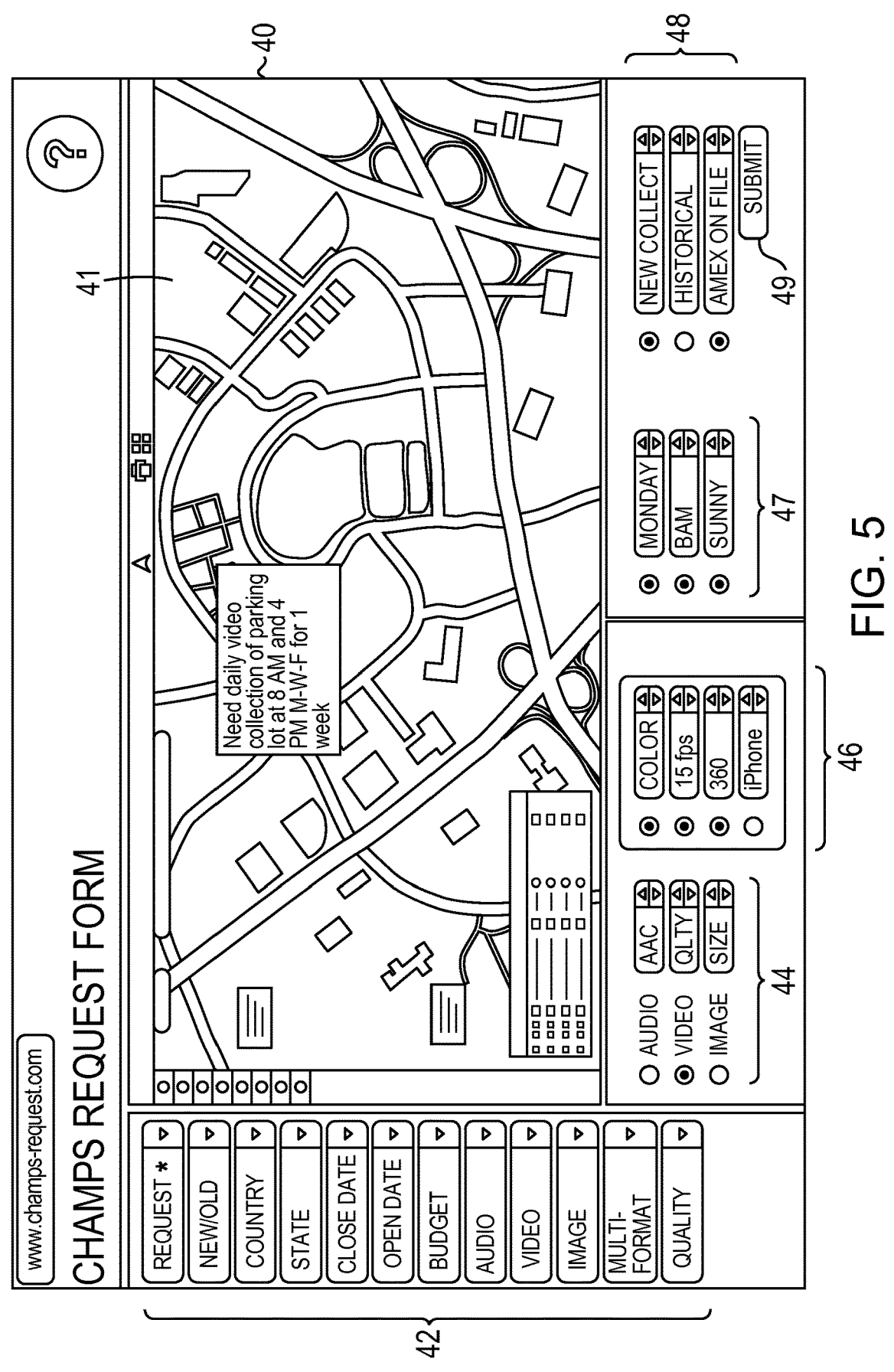
Figure 6:
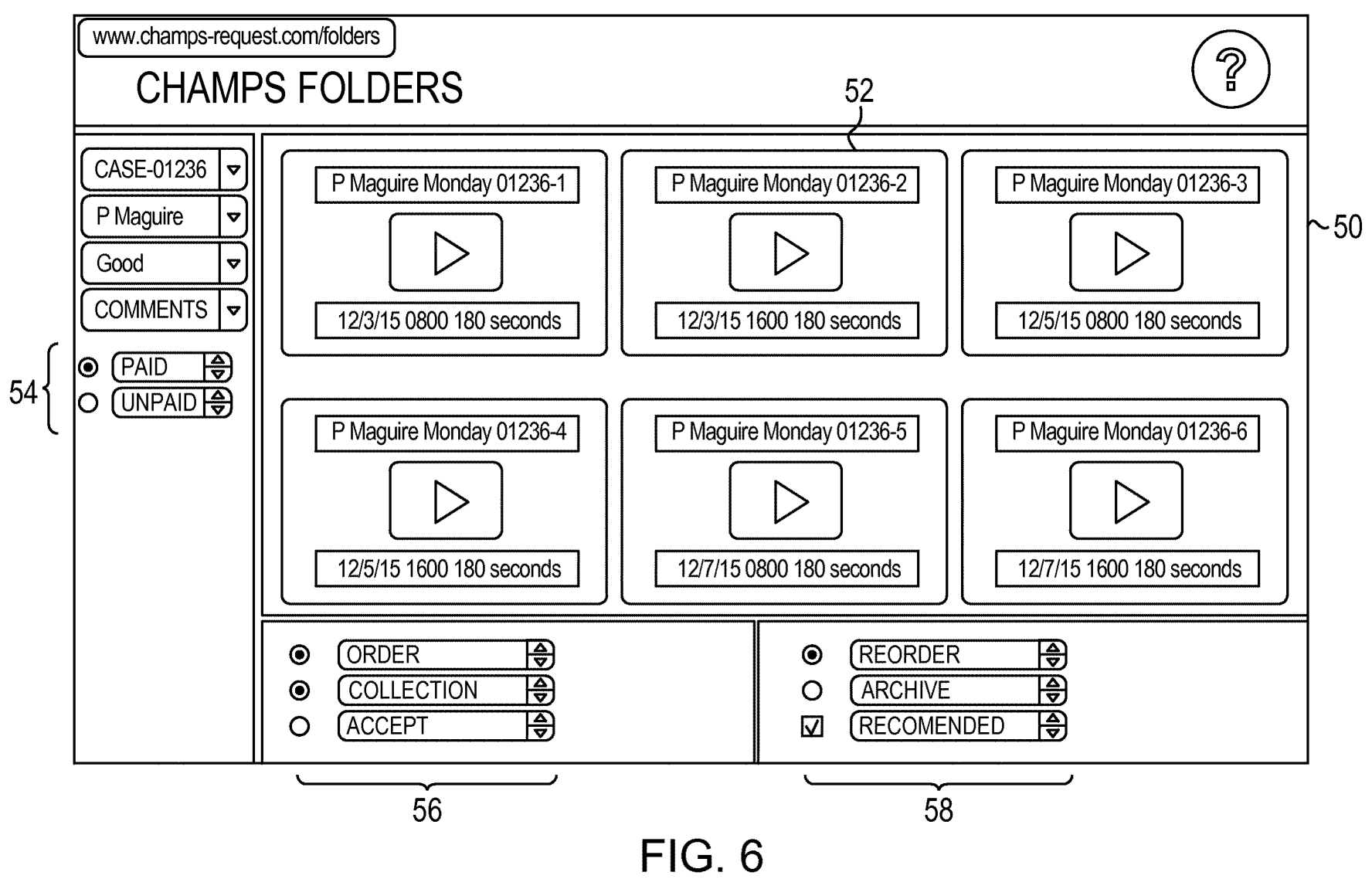
Figure 7:
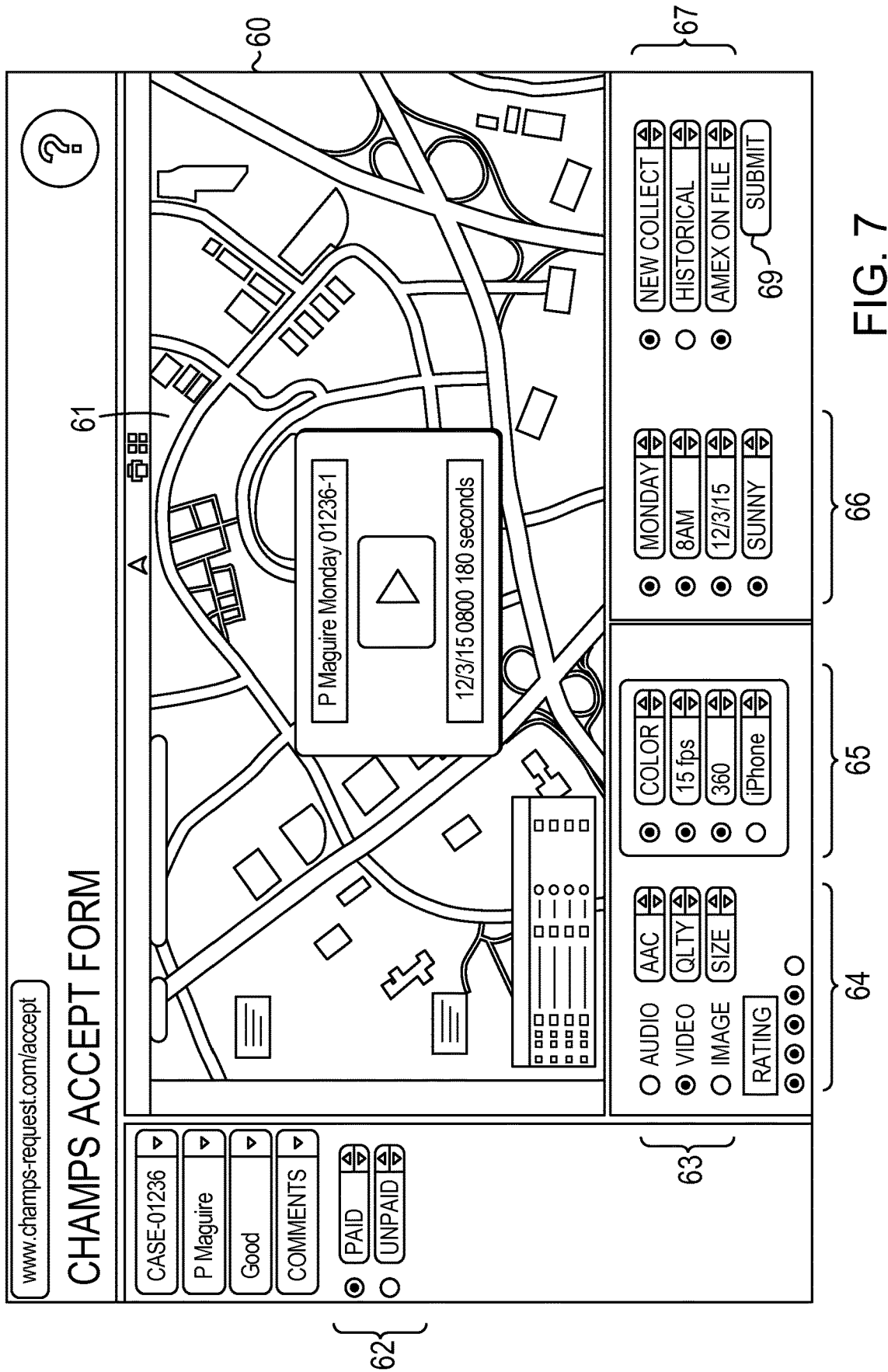

FIG. 2 shows an exemplary process according to the present invention. In step S1, the tasker uses device 10 to post a task. FIG. 5 shows an exemplary screen shot for creating a task. In step S2, at least one collector uses their device 14 to post a bid. FIG. 3 shows a table of bids for an exemplary request for images. The collectors then collect the requested artefacts in step S3. In step S4, the collectors use devices 14 to add the data to a collection, for example by uploading the data to the CHAMPS system. In step S5, the tasker uses device 10 to review and accept at least one of the collections. An exemplary screen shot of reviewing one or more collections is shown in FIG. 6, and FIG. 7 shows an exemplary screen shot of accepting a collection. Finally, in step S7 the tasker uses device 10 to pay the collectors whose collections were accepted.

Figure 4:
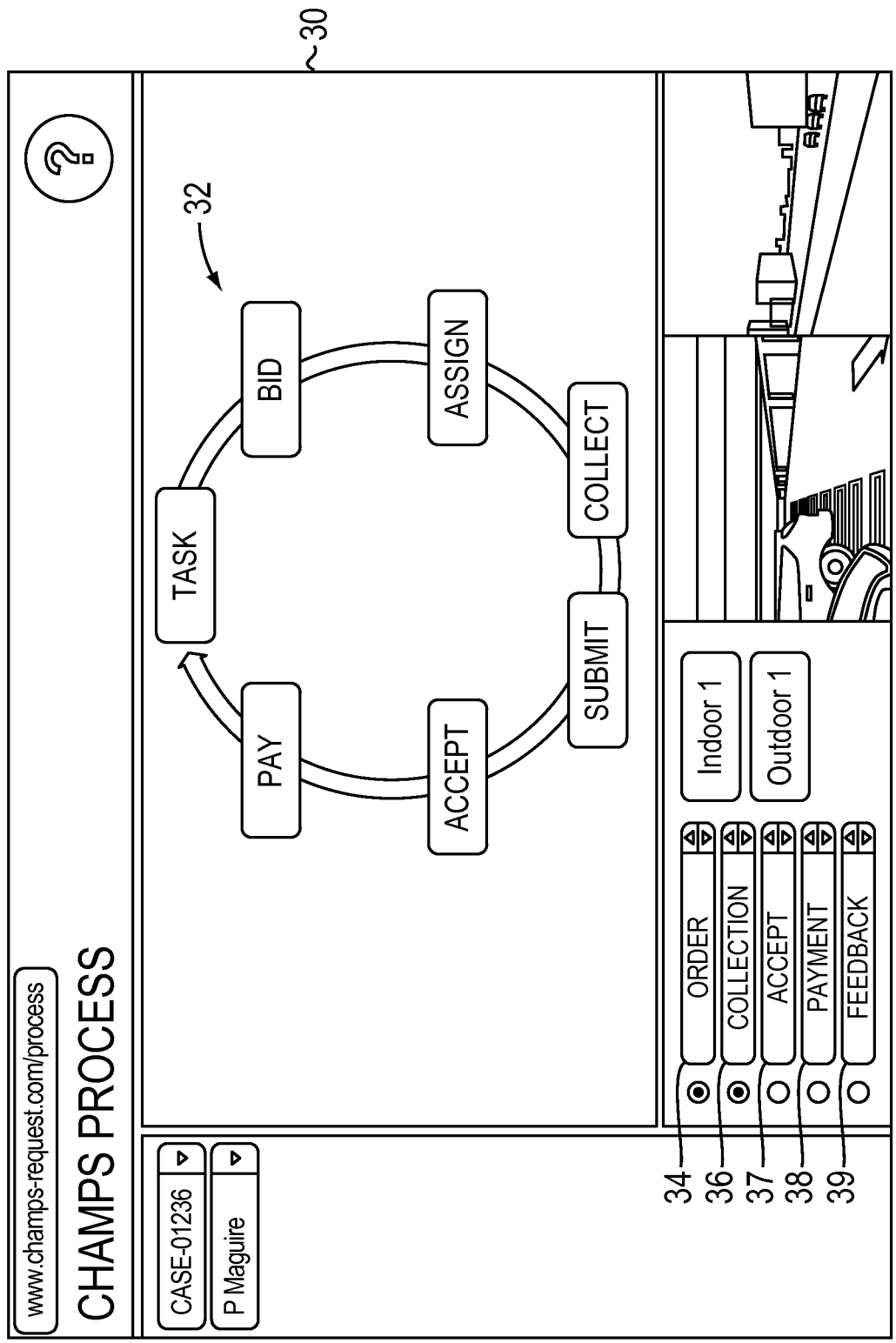

FIG. 4 shows an initial start-up screen shot 30 for an exemplary embodiment. Menu 32 allows a user to access any of the steps described above. Buttons 34 and 36-39 allow the user to perform one of the steps described above, or to provide feedback to a collection device 14. This feedback can be provided before or after acceptance. Thus, if a collector does not have exactly what is requested, the tasker can provide additional instructions to the collector.

FIG. 5 shows a screen shot 40 of an exemplary request formulation menu. Buttons 42, 44, and 46-48 provide a variety of options for the user to select to specify what they are requesting. All of the options on FIG. 5 are examples, and other sets of options are within the scope of the invention. Button 49 allows the tasker to submit the request to the collectors.

Buttons 42 include buttons for specifying an open date and a close date. This allows the tasker to ensure that data is not collected before a certain start date, and further that all data to be submitted must be provided by a certain end date to be considered.

A similar screen to FIG. 5 is shown on the collection device 14. The collection device 14 shows all of the specifications included in the request so the user can comply with the request, it simply does not allow the user to change any of the specifications.

FIG. 6 shows a screen shot 50 of an exemplary set of collections 52. Buttons 54, 56, and 58 allow the user to accept one or more of collections 52, and pay the appropriate collector. In one embodiment, the archive feature of button 58 functions such that once the tasker has evaluated the submission and accepted it or rejected it, it can be saved in an archive so it doesn't appear in future searches.

FIG. 7 shows a screen shot 60 of an exemplary acceptance form. Collection 61 has the attributes shown by menus 63, 65, 66, and 67. The user can provide a rating with button 64, and pay the collector with buttons 62. Button 69 allows the user to submit their acceptance of collection 61.

Rating button 64 may operate as follows. To help aid the knowledge seekers in finding acceptable submissions to their requests, knowledge seekers can allow their agents and/or anyone who is part of the ecosystem to rate a submission. Knowledge seekers can then filter submission based on these ratings. Knowledge seekers can also rate for themselves whether or not they accept a submission. Ratings will be on a 1-5 scale similar to many online retail stores. Over time both taskers and collectors can develop profiles based on previous transactions.

For more complex tasks where an individual collector or collection system is not sufficient to satisfy a tasker's request, the tasker has the option to open up the task in CHAMPS to a virtual team that can be formed and dissolved based on the specific task. For example, if a tasker wanted to know the size and sentiment of crowd at an upcoming event a CHAMPS virtual team task could be posted whereby an aerial survey company collects and provides the overhead imagery of the actual crowd and one or more people on the ground supplies video and/or observations of the actual crowd. That combined solution to the task would be managed in the CHAMPS interface. In some instances the different collectors are aware of their teammates and can coordinate in other cases they may not need to be aware of each other. The CHAMPS system would allow collectors who bid on tasks to manage groups of other collectors on a per task basis. It would work much the way "slug line" carpools work—where groups of people team up for a specific event—getting to work quickly on a given day but may never car pool together again. The owner of the car acts as the coordinator of the trip with different people on a task by task basis.

Accordingly, exemplary embodiments of the invention may have the following features:
- "tasks" are bid on by individuals and/or groups which are called "collectors."
- The CHAMPS engine allows "taskers" and "collectors" to conduct commerce securely and privately.
- CHAMPS "collectors" may use a CASES collection app or other available app or device as necessary.
- CHAMPS "collectors" may use all the functions of their handsets and tablets to compete tasks.
- Allows for world-wide collection activities.
- CHAMPS can utilize any commercially available collection method as well as a specific app to accomplish collections.
- The use of the CHAMPS technology is to combine crowd sourcing to accomplish multiple-modes of collection anywhere in the world. The proliferation of handsets and tablets has created a potential collection ecosystem of 7 billion people planet wide.
- CHAMPS is open enough that corporations or agencies can license the engine to conduct private and secure collection operations by licensing the underlying engine and CASES based collection app.

Advantages of CHAMPS may further include:
1. Single web site to task coaction anywhere in the world.
2. Secure transactions.
3. Rating transactions of taskers and collectors so that as the ecosystem grows reputational security
4. Can be used as a knowledge collection tool in real time—as opposed to collecting data and then sending it a later date in response to an alert.
5. Open API and SDK so that end customers can enhance and extend the software themselves—as opposed to a closed, proprietary, or non-existent SDK or API that forces end users to pay the developing company to extend the capability.

Applications for CHAMPS may include:
1. Disaster preparedness and response
2. Emergency response
3. Critical infrastructure protection
4. Transportation safety
5. Construction
6. Infrastructure build out
7. Asset tracking and surveys
8. General knowledge
9. Travel planning
10. Investment planning support Alternately, CHAMPS can use multiple applications in parallel and then combine on the server/cloud side.

Figure 8:
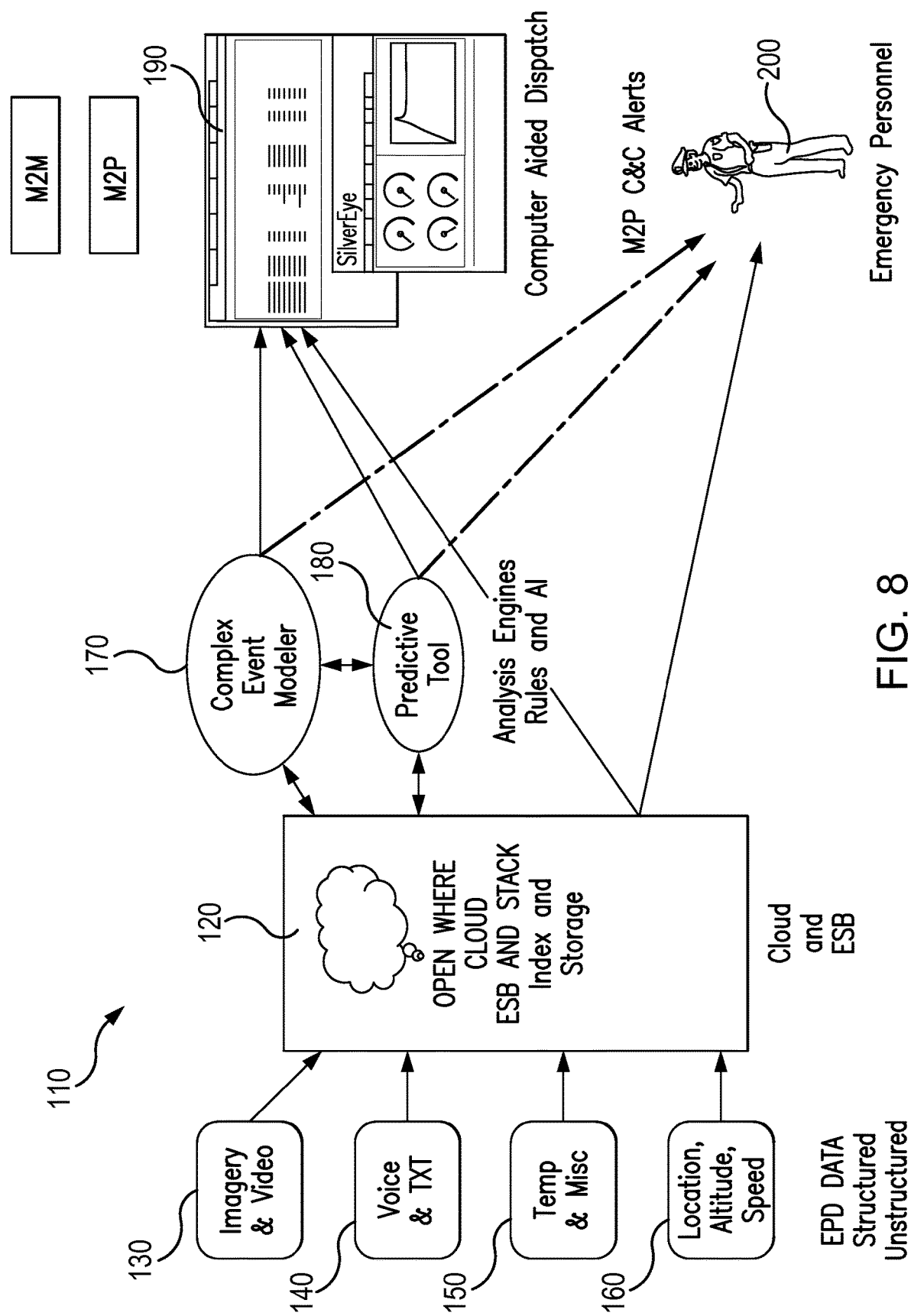
FIG. 8 is a diagram of the structure of a system according to a second exemplary embodiment of the present invention.

FIG. 8 shows an exemplary embodiment of a CASES system 110 in accordance with a second embodiment of the present invention. Server 120 receives data from a plurality of user devices such as image and video data from device 130, voice and text data from device 140, temperature and other data from device 150, and location, altitude, and speed data from device 160. Thus device 130 includes a sensor such as a microphone and a camera, device 140 includes a sensor such as a microphone and a keyboard for receiving text data that may be embodied by a touchscreen displaying the keyboard, device 150 includes a sensor such as a thermometer, and device 160 includes a device such as a global positioning system (GPS) sensor. Devices 130, 140, 150, and 160 may be smartphones, tablets, digital cameras, laptop or desktop computers or any other electronic device capable of collecting and transmitting this data. Further, any of the user devices 130, 140, 150, and 160 may include more than one sensor, or all of the sensors listed above. In general, each of devices 130, 140, 150, and 160 will include at least one sensor, a processor, memory, a transmitter for transmitting the data to server 120, and a receiver for receiving data from server 120. Server 120 also includes a processor, a memory, a transmitter for transmitting data to devices 130, 140, 150, and 160, and a receiver for receiving data from devices 130, 140, 150, and 160. Devices 130, 140, 150, and 160 will be referred to hereinafter as end point devices (EPDs).

In one embodiment, the EPDs are portable electronic devices that run one of the Android®, iOS®, or Blackberry® operating systems. An app run by the device performs the functions described herein as performed by the EPD. An exemplary portable electronic device is a wearable electronic device including a video camera and microphone described in U.S. patent application Ser. No. 13/212,686. This application is incorporated by reference herein. In another embodiment, the EPD may be a wearable (body worn) health tracking device such as the FitBit®, Pebble®, Basis Peak®, etc.

Server 120 may include a complex event modeler 170 and a predictive modeling tool 180 which analyzes the data received from the devices to determine if the data received from the devices corresponds to an event such as an emergency. The event can be a crime in progress, a severe weather event, or any emergency scenario where life or human/property security (e.g., child abduction, car break-in, arson, tornado, flash mob, etc.) is already or about to be imperiled. Server 120 manages and transforms event files and automatically generates notifications, including machine to machine (M2M) notifications, using a computer aided dispatch (CAD) tool 190, analytic tools, or command and control tools; and/or machine to person (M2P) notifications to a private or public actor 200 to respond to the event by sending an alert(s) to the actor 200 with information about the event derived from the uploaded data. The private or public actor can be an emergency first responder (law enforcement, fire, and/or ambulance), a crime investigation organization such as the FBI, public safety personnel, or a private security firm (such as hired for security at a sporting game like the Olympics, Super Bowl, or World Cup). The action taken by the actor can include dispatching one or more first responder(s), such as a fire truck, an ambulance, or a police vehicle and associated first responder personnel, or causing an amber alert to be issued, for example.

Complex event modeler 170 is the analytic engine inside the server 120 that allows thousands to millions of data feeds to come in from the EPDs and then alert on pre-defined thresholds. For example, if a fire is seen in a video the complex event modeler 170 will send an alert to the nearest fire department and send notices to EPD users in the immediate area. In one embodiment, complex event modeler 170 may include the GeoVigilance tool commercially available from Transvoyant.

Predictive modeling tool 180 is the analytic engine inside the server 120 that takes the alerts and data from the complex event modeler 170 and then "predicts" the next likely group of scenarios. For example, a fire on or near a major thoroughfare would generate an alert that indicates traffic will cause delays in the area and EPD users should plan accordingly. In one embodiment, predictive modeling tool 180 may include the SilverEye tool commercially available from Knowmadics, the Total Insight tool commercially available from Larus, or the Satellite Tool Kit (STK) commercially available from Analytical Graphics, Inc.

In one embodiment, CAD tool 190 includes the SilverEye web-based software application commercially available from Knowmadics, Inc. running in a CAD center. SilverEye may be the device management software in the system 110 that all the EPDs running the app are connected to. SilverEye in a CAD center allows data from EPDs to be visualized securely and quickly without having to replace the current investment legacy hardware/software in the CAD center. For example, a computer in the CAD center that has internet connectivity can visualize/playback imagery, video, and audio data from EPDs running the app as the data is collected to supplement the traditional data collected from a 911 call—location, voice description, and identity (phone number).

Alerts may be generated by the server 120 or CAD tool 190 based on the data received from the EPDs. For example, using SilverEye an operator can set an alert(s) based on certain conditions/groups of conditions being met or exceeded—location, time, key words, weather, and/or temperature etc. When the conditions set by the operator are met, the CAD tool 190 automatically generates an alert—machine-to-machine (M2M) or changes a condition on another device. For example, a geographic boundary/geo-fence can be created and when say 110 or more objects enter the boundary after 6 PM. Alerts may be generated by the server 120 or based on the data received from the EPDs. What triggers an alert—using SilverEye an operator can set an alert(s) based on certain conditions/groups of conditions being met or exceeded—location, time, key words, weather, temperature etc. that when the conditions are met automatically generates an alert—machine-to-machine (M2M) or changes a condition on another device. For example, a geographic boundary/geo-fence can be created and when say 110 or more objects enter the boundary after 6 PM, an alert can automatically be generated to a security guard to go check out the area for suspicious activity. In this case, an alert can automatically be generated by CAD tool 190 and transmitted to a security guard 200 to go check out the area for suspicious activity.

In another embodiment, server 120 or CAD tool 190 may generate alerts to be sent to EPDs by linking multiple EPDs to other types of devices such as cameras, audio recorders, trackers, seismic sensors, etc. For example, a geographic boundary can be set on the SilverEye control software so that when an EPD connected to system 110 enters, leaves, passes-by, etc. the geographic boundary an alert is generated which will enable a third party camera to track the EPD remotely without any human in the loop. That camera data can then be sent automatically to another EPD connected to system 110.

Figure 9:
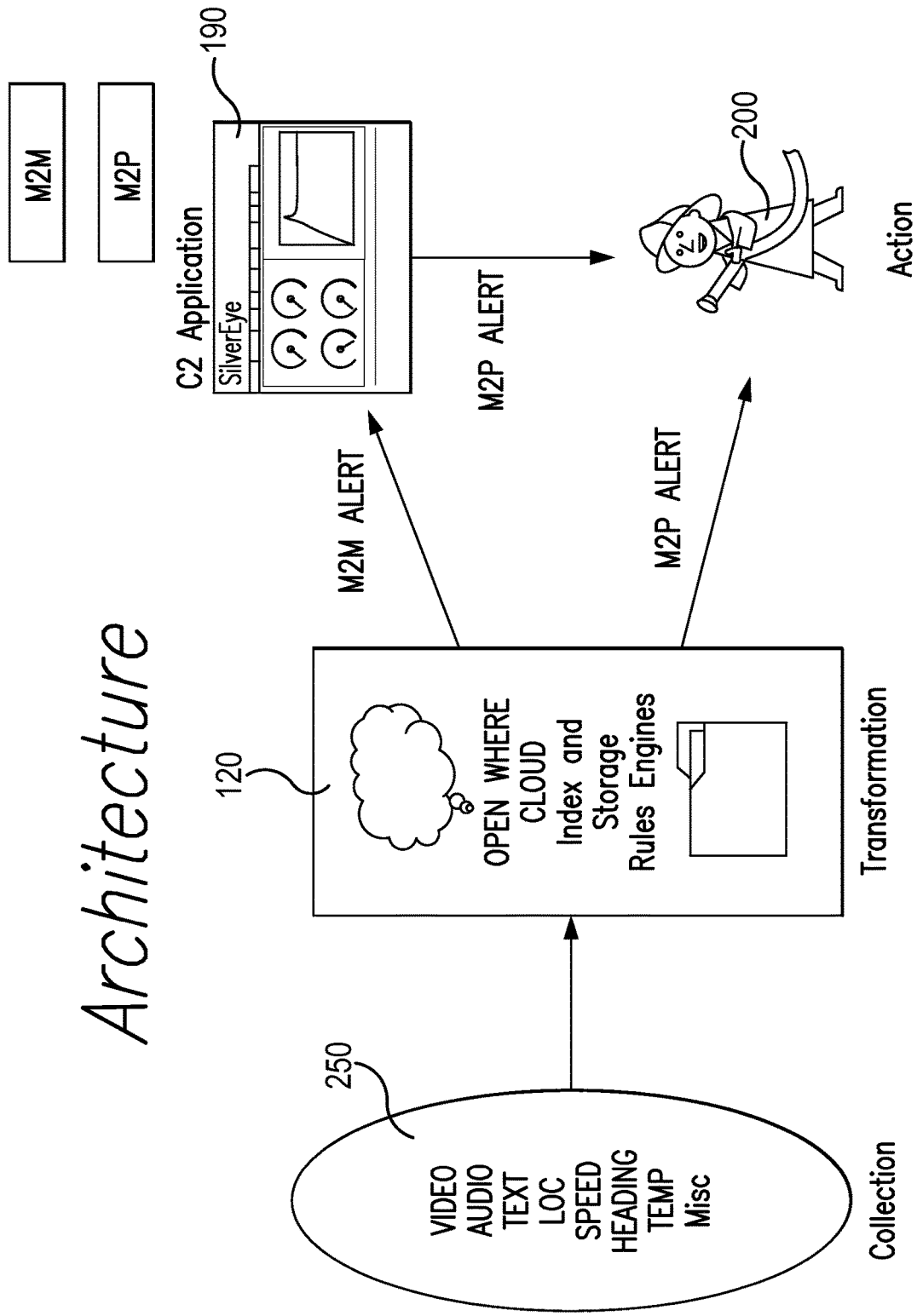
FIG. 9 is another exemplary system of the present invention.

In an exemplary embodiment shown in FIG. 9, EPD 250 is a smartphone capable of collecting all of the above described data, which runs an app to perform these functions. The app allows selectable wireless transmission of a known and/or anonymous user's geographic location coordinates, audio, video, voice, text, temperature, velocity, or altitude (or any other sensed data available on the EPD 250) to server 120.

Figure 10:
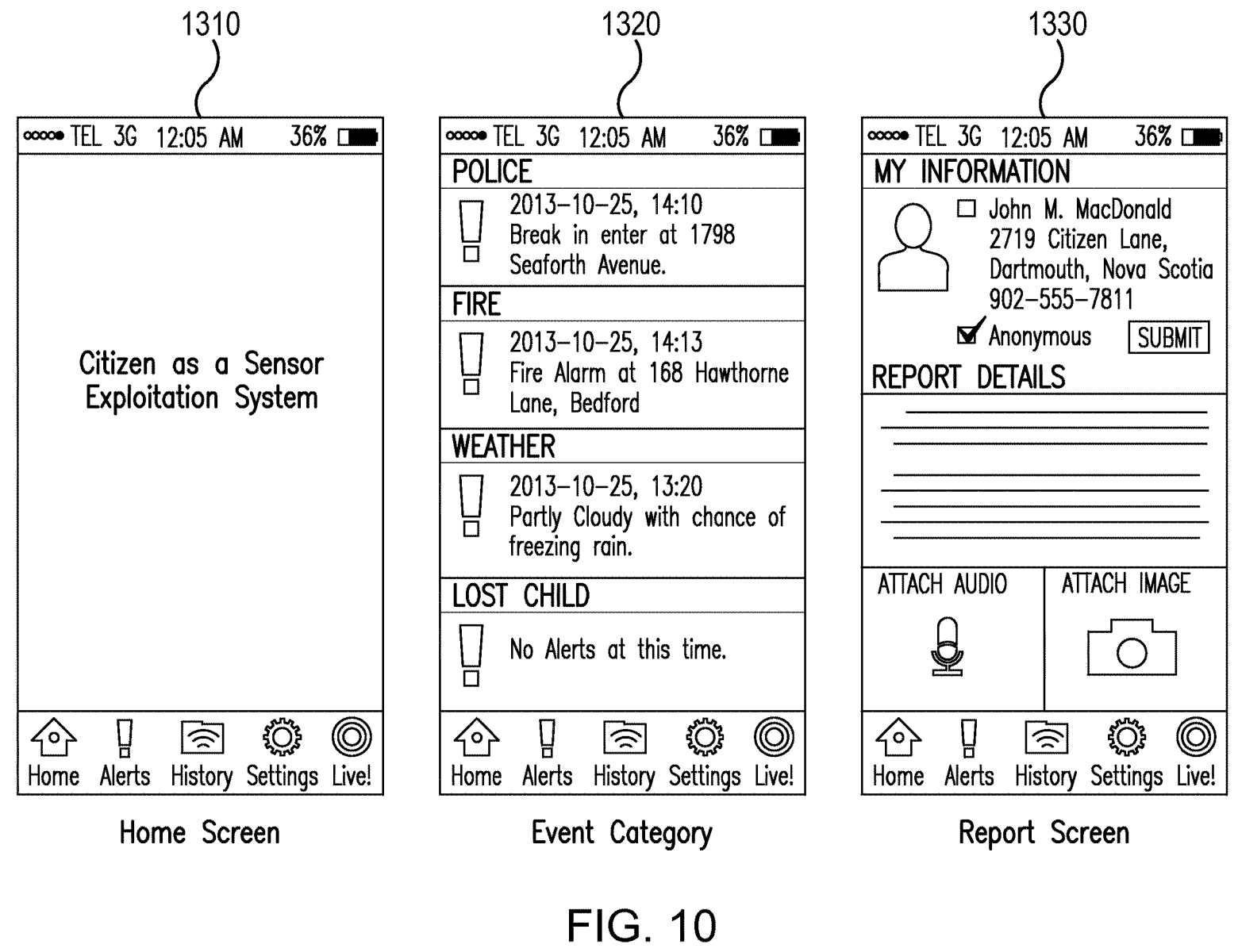

A user who witnesses an event can create a report on EPD 250 to upload to the server 120. FIG. 10 shows exemplary screen shots of EPD 250 creating a report. Screen 1310 shows an opening menu for creating a report. Screen 1320 allows a user to select a type of report (police, fire, weather, lost child, etc.). Screen 1330 allows the user to remain anonymous, and add whatever type of data they have collected to the report. The report can include a text summary of the incident the user wishes to report, and audio/video/photo attachments. The user identifies the type of alert, and the report, attachments are uploaded to the remote system, with the option to retain a copy of the report or to transmit without storing any data on the user's EPD. Multiple users (the crowd) witnessing the same incident/event can upload reports and sensor data about the event to the same remote system in a crowd-sourcing model. Data previously collected on the EPD 250 by other existing apps can be added to a CASES/AGENT report. For example, an image that was taken on an iPhone with the iOS® Camera app can be appended to a CASES report which is sent to a CAD tool 190.

Figure 11:
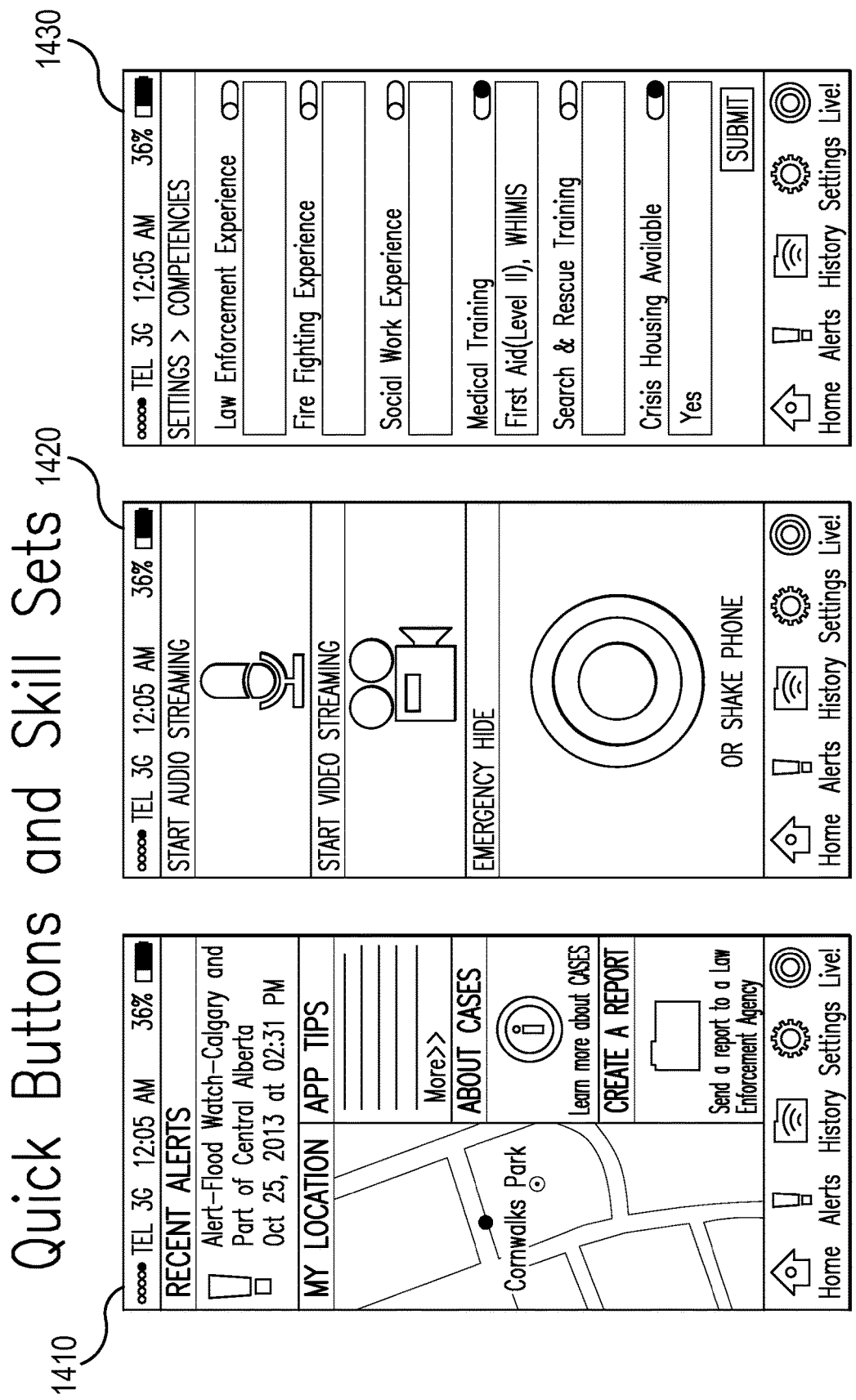

As shown in FIG. 11, screen 1410 shows alerts that other users in the vicinity of the event, and who have authorized their EPDs to receive alerts, can receive from the remote system 120 about the ongoing event. Screen 1420 allows the notified user to provide further data to server 120. Screen 1430 allows the user to notify the server 120 of the user's own skillset or competency (e.g., law enforcement, firefighting, social work, medical training, search and rescue, crisis housing), and if the event calls for a particular competency, the remote system can automatically send alerts to all users with competencies relevant to the event and who are located in the vicinity of the event information about the event so that the user can utilize their competencies to ameliorate negative consequences caused by the event. Such users would have authorized the app to track their location so that the remote system can send alerts only to those users located close to the event of interest, regardless of whether those users have witnessed the event or submitted a report.

Figure 12:
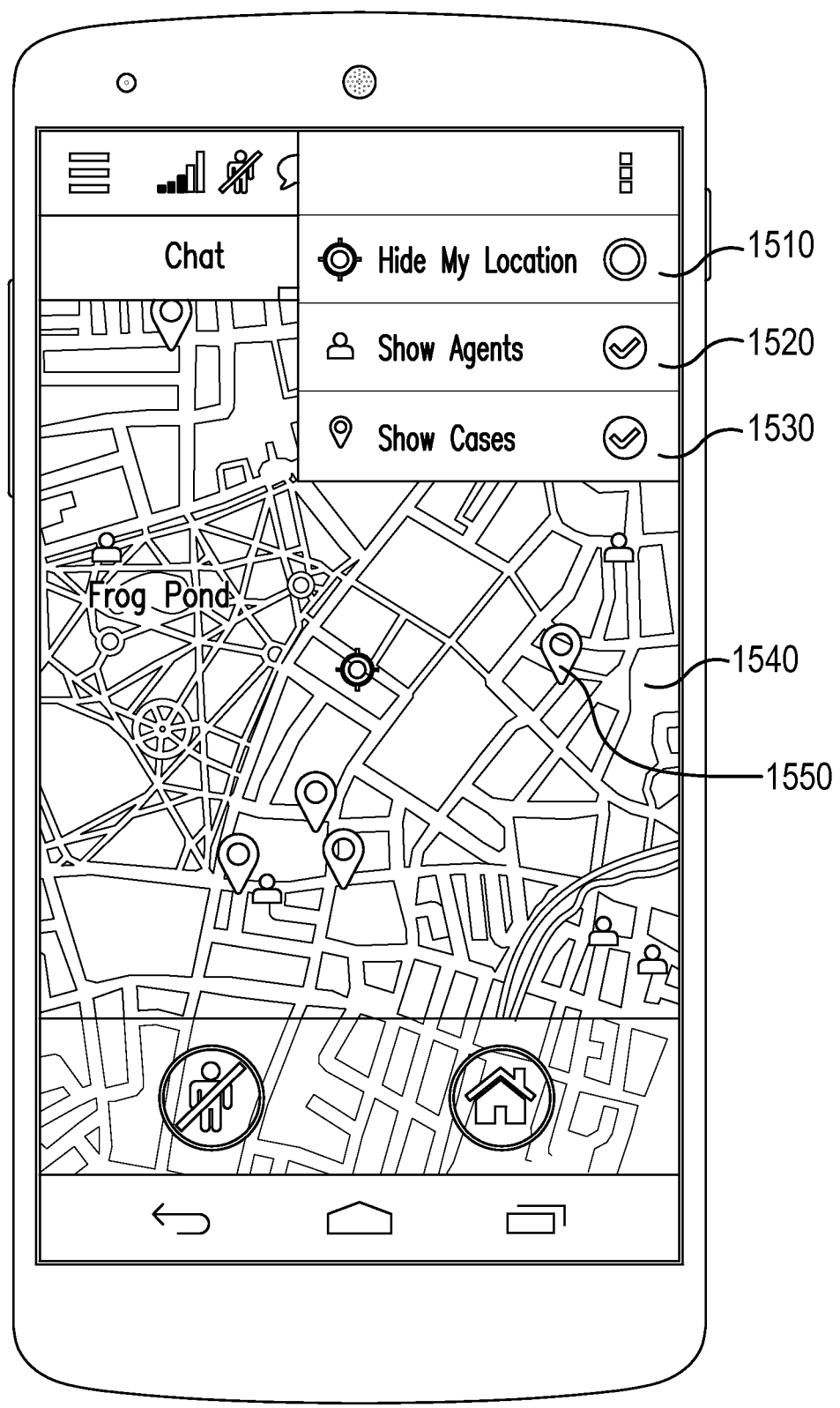
FIG. 12 illustrates a screen shot of an embodiment of the present invention where the client can display reported cases to a user on a map.

The server 120 can also provide a list of previously submitted reports to the EPD 250. As shown in FIG. 12, the EPD can display a map 1540 with indicators 1550 at each report location. Menu buttons 1510-1530 allow the user to select whether the map will include indicators to show their own location, other agents, and/or the report locations ("cases"). In the embodiment shown in FIG. 12, the user's own location is being shown, with the map roughly centered on the user's location. Even if the user's location is turned off with button 1510, the map may still be centered on the user's location as a default state. The map shown in FIG. 12 is a street map, but any local map is within the scope of the invention, such as maps of stadiums as discussed below.

Figure 13:
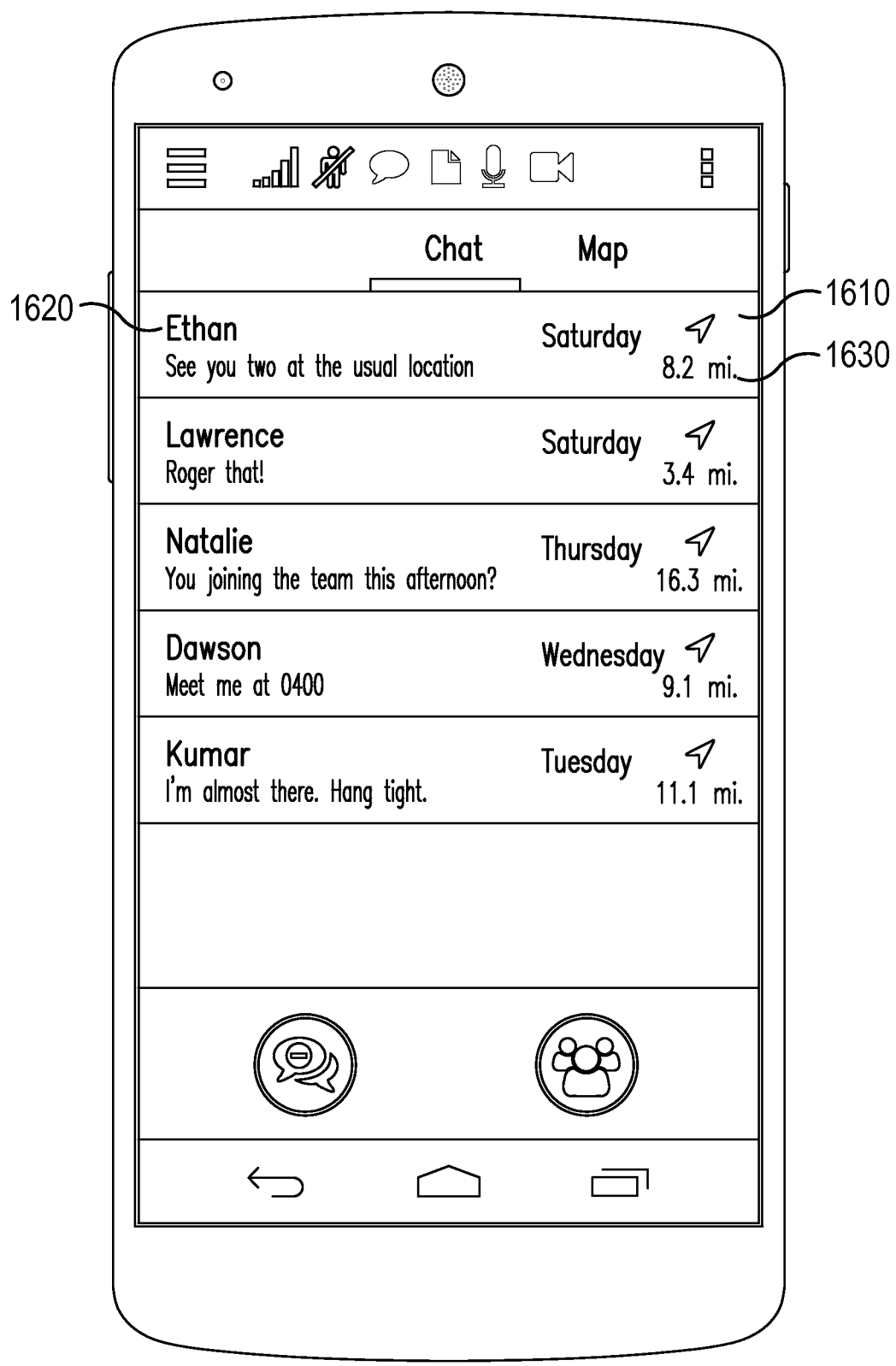
FIG. 13 illustrates a screen shot of an embodiment of the present invention where the client can display locations of chat participants.

Further, the EPD can support a chat function which allows the EPD user to chat as shown in FIG. 13. The EPD can display the distance 1630 and direction 1610 of a plurality of chat participants 1620 so that the user can directly gather further information about local events, or warn others.

Figure 14:
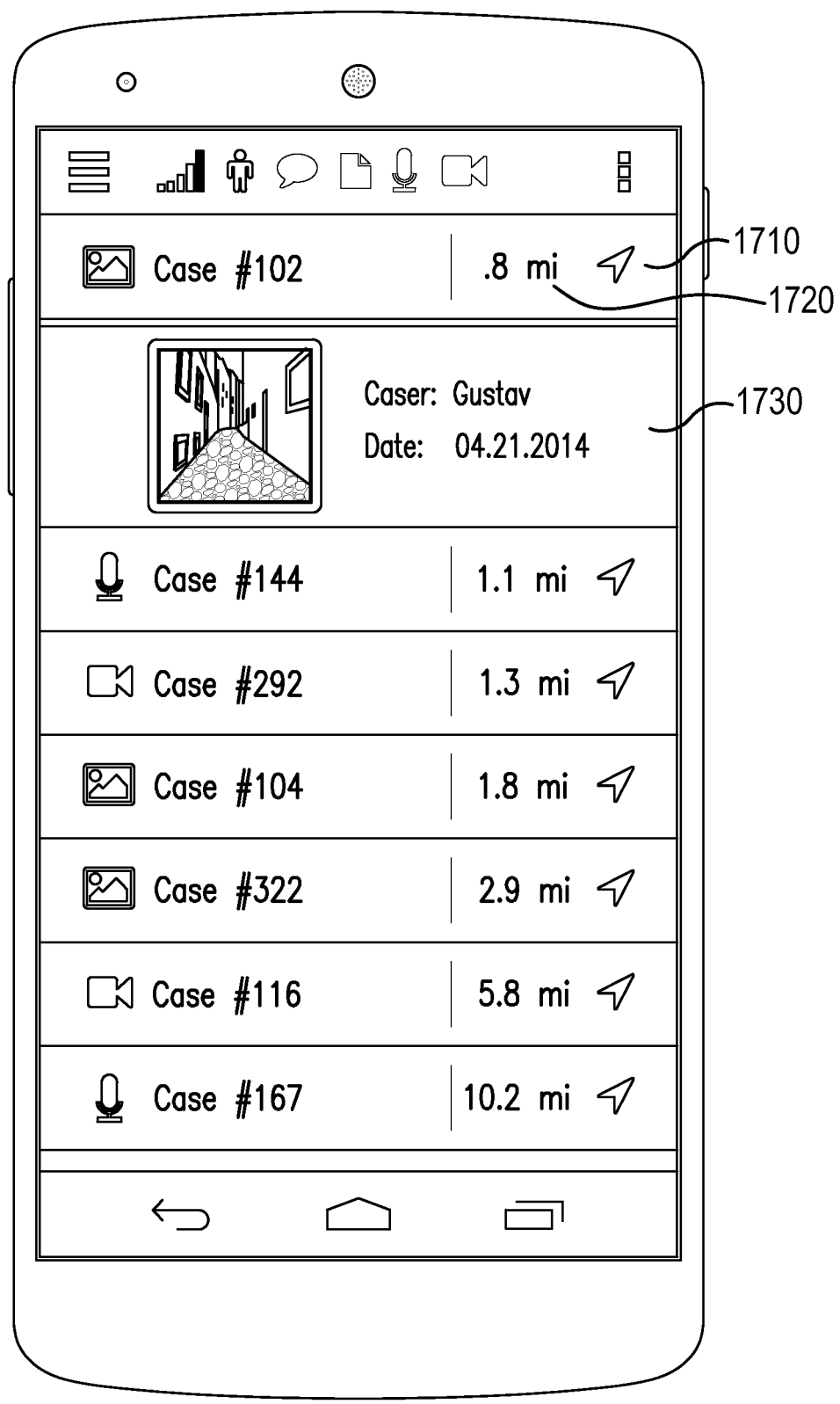
FIG. 14 illustrates a screen shot of an embodiment of the present invention where the client can display a list of reported cases and provide additional information on a selected case.
Figure 15:
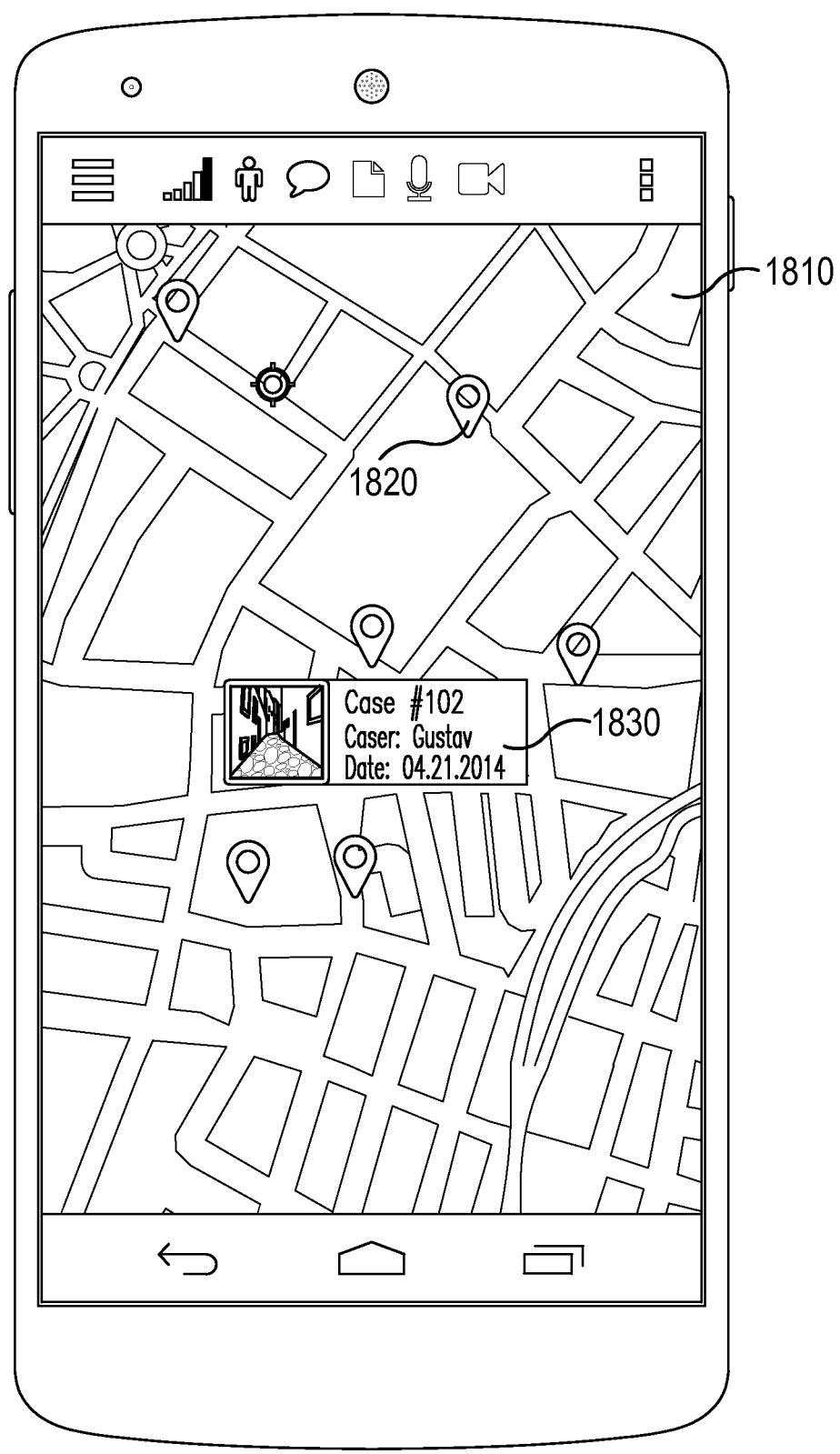
FIG. 15 illustrates a screen shot of an embodiment of the present invention where the client can display reported cases to a user on a map with additional information for a selected case.
Figure 16:
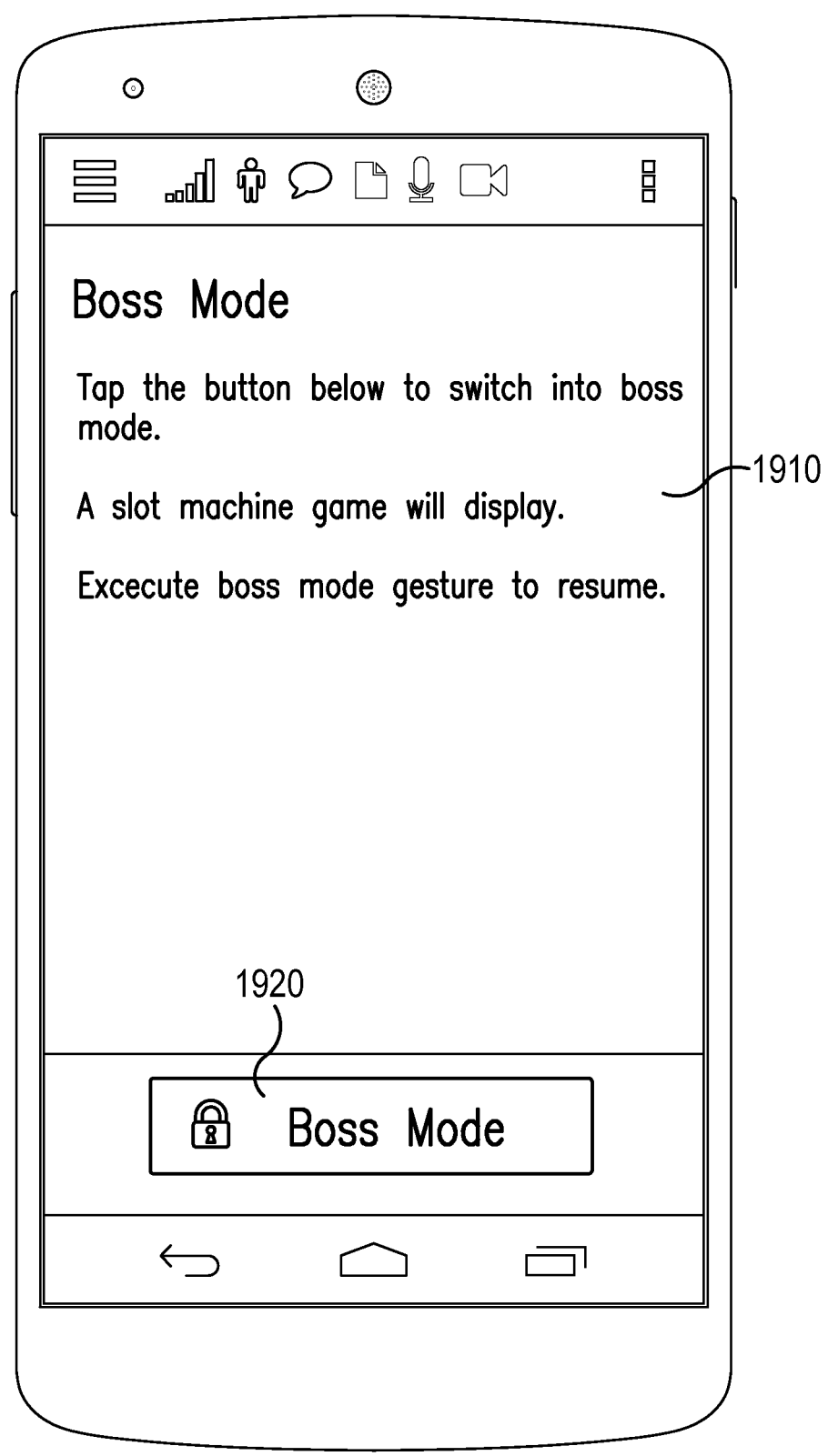
FIG. 16 illustrates a screen shot of an embodiment of the present invention where the client can be manually set in a boss mode.

FIG. 14 shows that the EPD displaying a list of local cases, along with the direction 1710 and distance 1720 to the location of the case. When a user selects a particular case, further information 1730 is provided. This further information may include some or all of the data the reporting EPD provided to the server 120. This further information may be displayed on the map proximate the location of the case, as shown in FIG. 15. FIG. 15 illustrates an exemplary map 1810 with case location markers 1820 and case information 1830.

Any user can also authorize the EPD to turn any selected sensor on the EPD on or off (e.g., microphone, camera, GPS, accelerometer) and upload the selected sensor outputs in real time to the server 120. Further, by selecting the boss mode button 1920 shown on screen 1910 of FIG. 16, this can be done surreptitiously for the safety of the user. In this case, an innocuous screen is displayed during data collection, such as the exemplary game display 2000 shown in FIG. 17. Any screen unrelated to data collection may be used to prevent a hostile person from seeing that the user is collecting and reporting data, possibly related to a crime being committed by the hostile person.

In another embodiment, server 120 issues a command to the EPD 250 to enter boss mode without any command by the user of EPD 250. In this regard, a rule set can be established by server 120 based on conditions being met that would automatically enable collection to occur on the EPD 250 without the user having to do anything. In one embodiment, server 120 can command each EPD 250 to start recording/streaming video whenever the EPD 250 was within 1 mile of a landmark such as the Washington Monument. In another embodiment, the server 120 may command every EPD 250 within a set distance of a reported case to begin recording sensor data and to transmit the sensor data to server 120.

Figure 18:
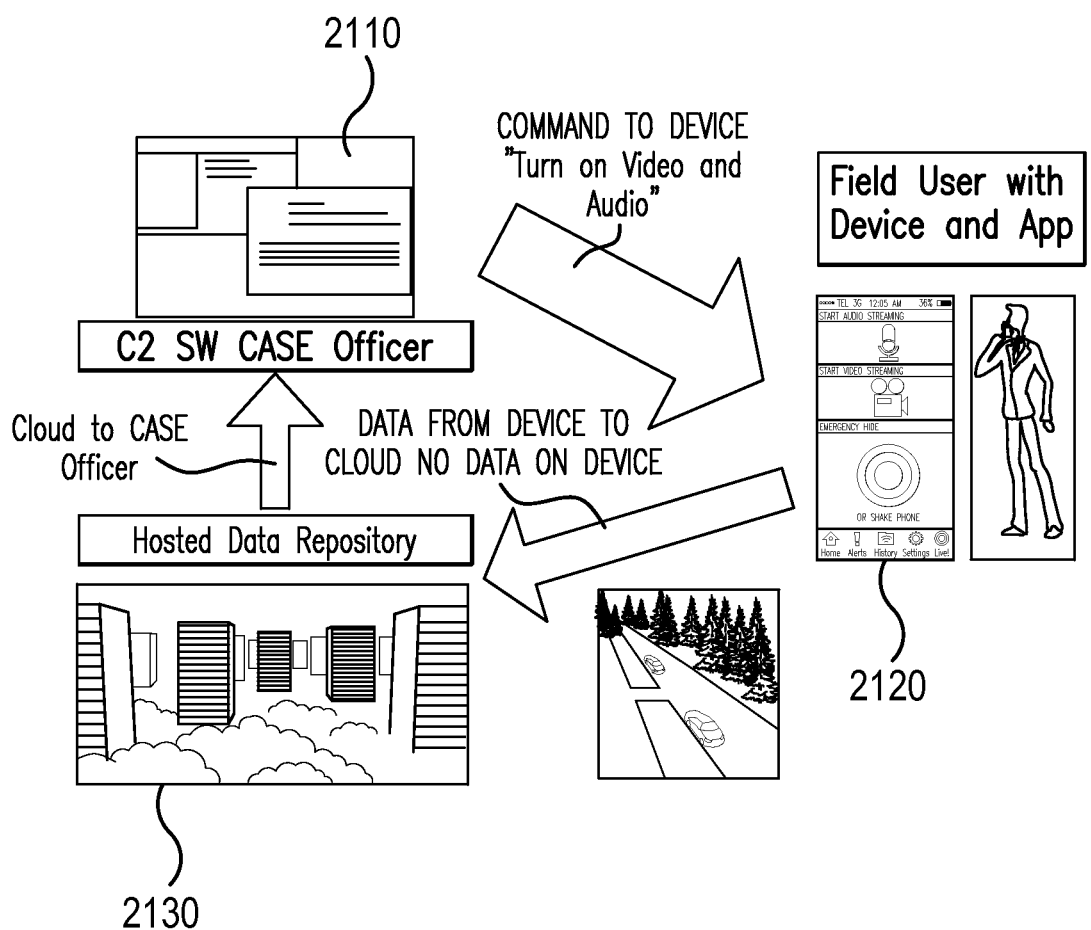
FIG. 18 illustrates another exemplary system according to the present invention.

The EPD also allows the user to select three levels of participation: anonymous in which the user uploads reports or sensor data anonymously, passive in which the user's personal identification information is reported with the sensor data uploaded, and remote control in which the user allows the remote system to control one or more sensors on the user's EPD for transmission to the remote system. The EPD can be placed in an invisible or surreptitious mode in which it will transmit sensor data in the background without conveying any human-discernible cues that it is doing so. In this regard, FIG. 18 shows that a server 2110 can send a command to device 2120 to collect and transmit data without the user knowing. The data is sent to repository 2130 to be analyzed by server 2110.

Figure 19:
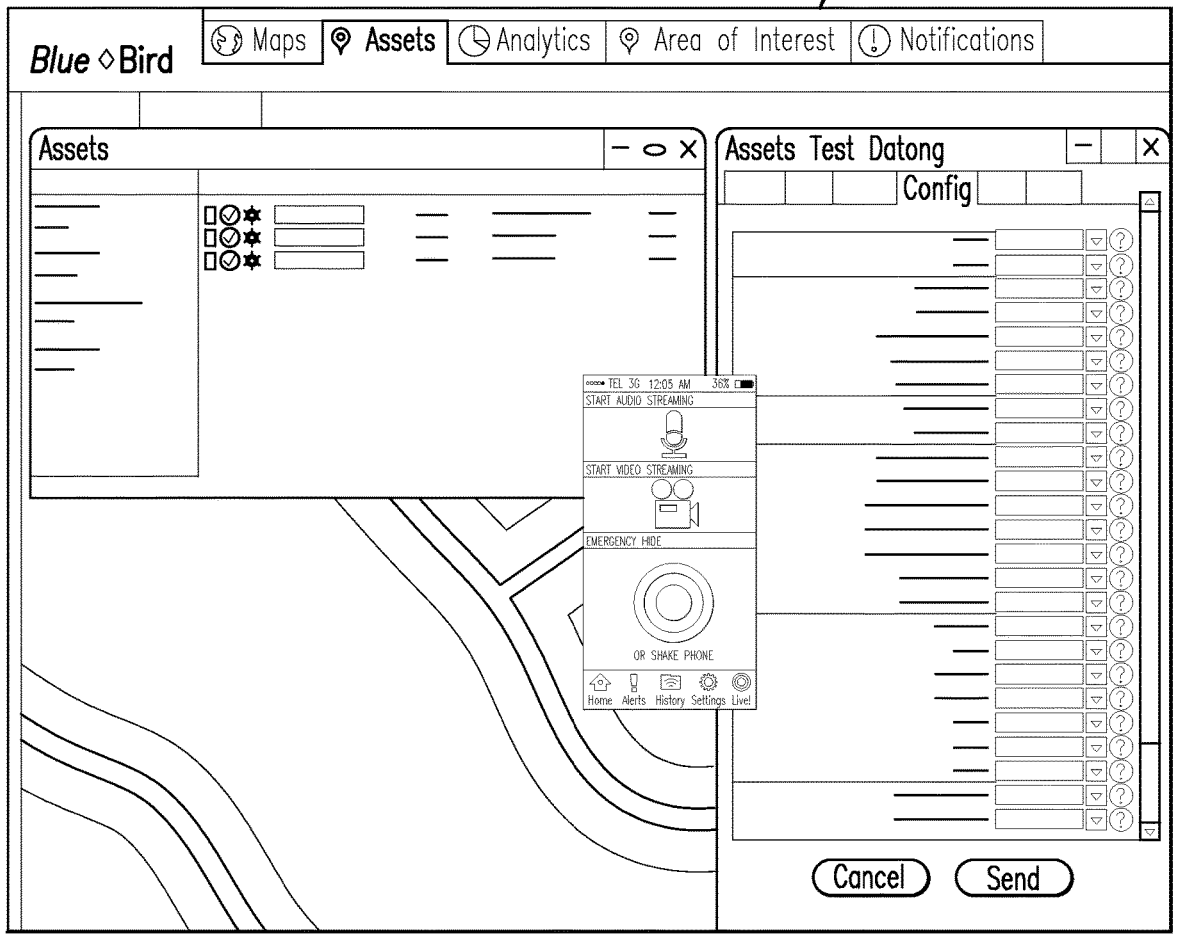
FIG. 19 illustrates an exemplary server that may be part of the systems shown in FIGS. 8, 9, and 18.

FIG. 19 shows an exemplary display of the CAD tool 190, which may be embodied by SilverEye™ software. The features of this tool are described above with respect to FIG. 8.

In another exemplary embodiment, the above described features may be divided between two apps, the CASES app and the CASES AGENT app. CASES and CASES AGENT apps are distributed on EPDs with back end support provided through a cloud model controlled via an enterprise service bus (ESB). The primary CASES app turns EPDs into sensors and those sensors can be used in a crowd-sourced fashion to help law enforcement, public safety, and defense personnel in a time of crisis or danger. The CASES ecosystem involves the software app and the software back end data transformation which occurs in the cloud as data from the EPDs is analyzed and in the cloud. The CASES AGENT app has secondary features that allow it to be used (turned on and off) remotely.

Primary features include:

Philosophy of CASES and CASES AGENT=Collection-Transformation-Action

CASES and CASES AGENT are part of an ecosystem that includes a downloadable app which connects to a cloud based transformation engine which then sends machine to machine (M2M) and/or machine to person (M2P) alerts which cause action to occur in the real world.

It was designed primarily for everyday use as well as venue/event specific use. End users (civilians) can see an event and send data as quickly and easily as possible as an enhancement to public safety.

Data is received by the CASES back end processing capability in the cloud transforms the raw data feeds into a case.

The app can be customized by end users and white labeled for specific events—such as the Super Bowl, Olympics, World Cup, Grand Prix, etc. In those instances the actual seating chart of the venue could be downloaded as an add on and users in the ecosystem can identify where they are sitting/standing so that when an event occurs the data they generate can be tied to a specific area within the event.

Uses the off-the-shelf/out-of-the-box capability of the EPDs to send data—location, audio, video, text, temperature, speed, altitude and any other data that can be collected by the EPD to the cloud for follow on analysis, cataloguing, and distribution.

Quick way for average citizen to share observations from their EPDs.

Venue Specific downloads are available so that at an event CASES users can let people know where they were sitting/standing etc. when an event occurred.

Everyday CASES users can register any particular skill set they have that would make them more useful in an actual emergency so that officials would know what type of Good Samaritan support there was near an emergency.

CASES reports can be shared with public safety and law enforcement personnel.

Directly to Law Enforcement, public safety, or to a "Cut out" server which is accessible by personnel at a computer aided dispatch (CAD) center or public-safety answering point (PSAP), sometimes called "public-safety access point" (a call center responsible for answering calls to an emergency telephone number for police, firefighting, and ambulance services). This CAD center may house the CAD tool 190 as described above.

An enhanced version of CASES called CASES AGENT has all of the same capability plus listed above plus:

The AGENT version can be remotely controlled by command and control (C2) software in server 120 to turn on/off the camera, audio and locational data streams from EPD 250 the AGENT version is hosted on, as shown in FIG. 18. This command to enter boss mode by the server 120 does not involve any input by the user of EPD 250, as discussed above.

AGENT Version has a panic button feature.

Figure 17:
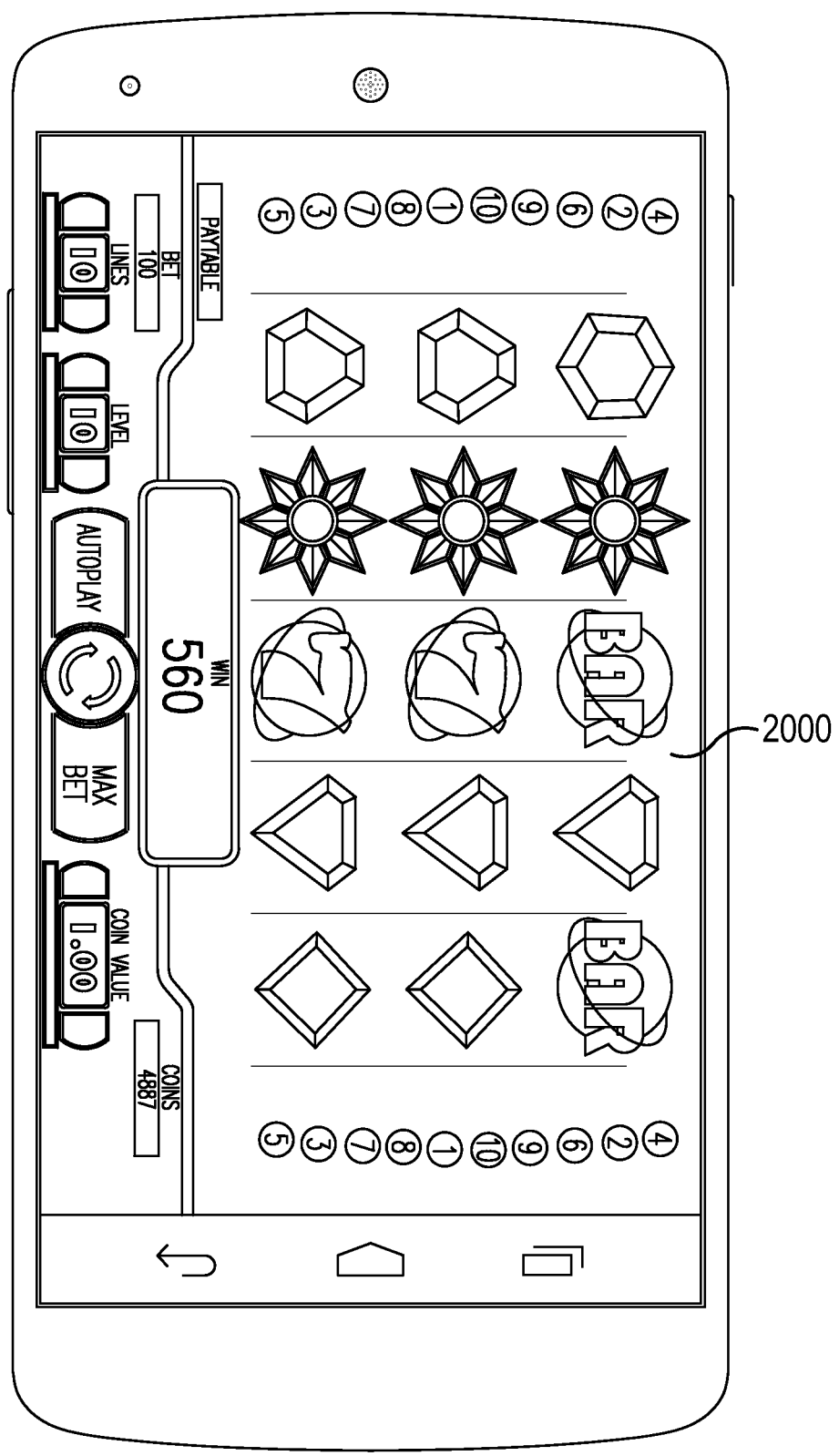
FIG. 17 illustrates a screen shot of an embodiment of the present invention where the client is currently in boss mode.

AGENT Version has a manually selected boss mode so that a user can make it appear as if the app is not running if they had to turn their EPD over for forensic inspection, as shown in FIG. 17.

AGENT Version has a primary mission of information collection for public safety.

AGENT Version can be scheduled to turn and off based on time of day and/or location.

The remote system can communicate with, for example, the FBI, the DEA, other law enforcement, public safety, or military operations.

Thus, the CASES and CASES AGENT app technologies combine crowd sourcing with civic responsibility to create an ecosystem where modern technology—specifically the billions of dollars of investment in EPDs and the cloud—can be used to do good. It puts technology that is already in the hands of ordinary citizens to work for the common good. Some advantages of the CASES and CASES AGENT app include that it creates a central application to process and fuse multiple types of data from EPDs and then easily send it from the EPD to the cloud with a simple buttons.

The CASES and CASES AGENT apps are designed to be customized so that it can be licensed to a sponsor who becomes the sponsor of the app being used at specific events such as the Olympics, etc. It can be customized so that certain EPD features can be turned on and turned off in countries where data collection of this type is prohibited.

Additional advantages of the invention may include (this list is not exhaustive):
1. Single screen app interface—as opposed to 2-4 separate applications with multiple interfaces, such as having a separate app to track a phone, an app to take a picture, an app to record audio, an app to record a video, or an app to chat.
2. Multiple date feeds from multiple EPD sensors—as opposed to a user experience where each screen can only handle one feed at a time.
3. Crowd sourced data inputs from social media—as opposed to just getting one way notification alerts from a Rich Site Summary (RSS) feed or broadcast.
4. Can be used as an information collection and transmission tool in real time—as opposed to collecting data and then sending it at a later date in response to an alert or after an event. For example, the Boston Marathon Bombing had thousands of people collecting images and video, but without any way to easily and rapidly transmit that data to public safety and law enforcement personnel. The FBI was forced to manually collect data from EPDs from witnesses and then fly that data from Boston, Mass. to FBI facilities in Quantico, Va.
5. Open Application Programming Interface (API) and Software Development Kit (SDK) so that end customers can enhance and extend the software themselves—as opposed to a closed, proprietary system, or non-existent SDK or API that forces end users to pay the developing company to extend the capability.
6. Secure data transmission using Triple Data Encryption Standard (DES) or Advanced Encryption Standard (AES) 128/256 encryption for communications between the EPDs 250 and the data server 120.
7. Multi-modal data transmission pathways from the EPD 250 where data can be transmitted from the EPD 250 through either commercial terrestrial telephony (2G, 3G, 4G, LTE, etc.), Wi-Fi, and/or satellite communications pathways.

Applications for the aspects of the present disclosure include:
1. Public safety
2. Emergency response
3. Crime prevention
4. Law Enforcement
5. Information collection
6. Military/law enforcement hostile forces tracking
7. Military/law enforcement blue force (Agent/CI) tracking
8. Military/law enforcement mission planning
9. Military sensor planning
10. Critical installation protection Multiple applications can be used in parallel and then combined on the server 120.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An electronic device comprising a display, at least one processor and a memory comprising instructions, the instructions being executable by the at least one processor to at least:
create a request for data associated with an upcoming event, the request for data including one or more specifications of data to be requested to collect data associated with the upcoming event and complying with the one or more specifications, the one or more specifications indicating a type of the data to be requested, a date and/or time for collecting the data to be requested, and a location of the upcoming event associated with the data to be requested;
transmit the request for data to a plurality of collecting devices,
receive one or more bids from one or more collecting devices in response to the request for data, each bid including a type of data to be collected by at least one collecting device, a location of the at least one collecting device, a delivery date for the at least one collecting device to deliver the data to be collected, and/or proposed payment for the at least one collecting device to collect the data;
receive one or more data collections complying with the one or more specifications from the one or more collecting devices after the event has occurred;
display a user interface on the display, the user interface including 1) a map indicating a location of the at least one data collection received from the at least one of the plurality of collecting devices, 2) an icon or label, shown on the map, indicating the at least one data collection, 3) one or more menu items indicating one or more attributes of the received at least one data collection and 4) a submit item enabling a user of the electronic device to accept the at least one data collection wherein the map, the icon or label, the one or more menu items and the submit item are displayed simultaneously on the user interface to enable the user to accept the at least one data collection in accordance with the specifications of the request for data and the one or more attributes of the at least one data collection;

receive a command to accept the at least one data collection from the user;

generate an acceptance message in response to the received command;

transmit the acceptance message to the at least one of the plurality of collecting devices; and transmit payment to each of the at least one of the plurality of collecting devices to which the acceptance message was sent.

2. The electronic device according to claim 1, wherein the electronic device is a smartphone.

3. The electronic device according to claim 1, wherein the request is created based on an input from the user of the electronic device.

4. The electronic device according to claim 3, wherein the request includes a specification for a video sequence.

5. The electronic device according to claim 3, wherein the request includes a specification for an audio sequence.

6. The electronic device according to claim 3, wherein the request includes a specification for an image.

7. The electronic device according to claim 3, wherein the request includes a start date.

8. The electronic device according to claim 3, wherein the request includes an end date.

9. The electronic device according to claim 1, wherein the display is configured to display a user interface enabling a user to configure the request for data including the one or more specifications of the data to be requested.

10. The electronic device according to claim 1, wherein the data to be requested is video, audio and/or imagery data, the video, audio and/or imagery data being recorded at a location of each of the one or more collecting devices.

11. The electronic device according to claim 1, wherein the submit item is a submit button.

12. The electronic device according to claim 1, wherein the one or more attributes of the received at least one data collection comprise:
    a time, a day, a date and a weather condition regarding the at least one data collection;
    a type of the at least one data collection, the type including audio, video or image;
    a user comment or rating of the at least one data collection;
    a payment type attribute indicating whether the at least one data collection is paid or unpaid;
    an attribute indicating whether the at least one data collection is new or historical; and/or
    a source of the at least one data collection.

13. The electronic device according to claim 1, wherein the icon or label shown on the map includes information representing at least a portion of the one or more attributes of the at least one data collection indicated by the one or more menu items.

14. An electronic device comprising a display, a sensor, at least one processor and a memory comprising instructions, the instructions being executable by the at least one processor to at least:

receive a request for data associated with an upcoming event from a tasking device, the request for data including one or more specifications of data to be requested to collect data associated with the upcoming event and complying with the one or more specifications, the one or more specifications indicating a type of the data to be requested, a date and/or time for collecting the data to be requested, and a location of the upcoming event associated with the data to be requested, display a user interface on the display, the user interface including 1) a map indicating a location of the received request for data, 2) an icon or label, shown on the map, indicating the received request for data, and 3) one or more menu items indicating the one or more specifications of the data to be requested, wherein the map, the icon or label and the one or more menu items are displayed simultaneously on the user interface to enable a user of the electronic device to generate a bid in response to the request for data in accordance with the one or more specifications of the data to be requested, transmit the bid to the tasking device, the bid including a type of data to be collected by the electronic device, a location of the electronic device, a delivery date for the electronic device to deliver the data to be collected, and/or proposed payment for the electronic device to collect the data, collect data complying with the one or more specifications by the sensor, transmit the data collected by the sensor to the tasking device after the event has occurred, receive an acceptance message from the tasking device, and receive payment from the tasking device.

15. The electronic device according to claim 14, wherein the electronic device is a smartphone.

16. The electronic device according to claim 14, wherein the request includes a specification for a video sequence.

17. The electronic device according to claim 14, wherein the request includes a specification for an audio sequence.

18. The electronic device according to claim 14, wherein the request includes a specification for an image.

19. The electronic device according to claim 14, wherein the request includes a start date.

20. The electronic device according to claim 14, wherein the request includes an end date.

21. The electronic device according to claim 14, wherein the data collected by the sensor is video, audio and/or imagery data, the video, audio and/or imagery data being recorded at the location of the electronic device.

22. The electronic device according to claim 14, wherein the one or more menu items are not changeable by the user.

23. The electronic device according to claim 14, wherein the one or more specifications of the data to be requested comprise:
    a time, a day and a weather condition regarding the data to be requested;
    a close date and/or open date of the data to be requested;
    a budget of the data to be requested;
    a quality attribute of the data to be requested;
    a type of the data to be requested, the type including audio, video or image;
    an attribute indicating whether the data to be requested is new or historical; and/or
    a location, country and/or state regarding the at least one data collection.

24. The electronic device according to claim 14, wherein the icon or label shown on the map includes information representing at least a portion of specifications of the data to be requested indicated by the one or more menu items.

25. The electronic device according to claim 14, wherein the icon or label prominently displays information representing at least a portion of the one or more specifications of the data to be requested on the user interface in a superimposed relation to the map, and the one or more menu items are positioned along a border of the user interface and adjacent to the map.

26. A method comprising:
transmitting a request for data associated with an upcoming event to a plurality of collecting devices, the request for data including one or more specifications of data to be requested to collect data associated with the upcoming event and complying with the one or more specifications, the one or more specifications indicating a type of the data to be requested, a date and/or time for collecting the data to be requested, and a location of the upcoming event associated with the data to be requested;
receiving one or more bids from one or more collecting devices in response to the request for data, each bid including a type of data to be collected by at least one collecting device, a location of the at least one collecting device, a delivery date for the at least one collecting device to deliver the data to be collected, and/or proposed payment for the at least one collecting device to collect the data;
receiving one or more data collections complying with the one or more specifications from the one or more collecting devices after the event has occurred;
displaying a user interface on the display, the user interface including 1) a map indicating a location of the at least one data collection received from the at least one of the plurality of collecting devices, 2) an icon or label, shown on the map, indicating the at least one data collection, 3) one or more menu items indicating one or more attributes of the received at least one data collection, and 4) a submit item enabling a user of the electronic device to accept the at least one data collection wherein the map, the icon or label, the one or more menu items and the submit item are displayed simultaneously on the user interface to enable the user to accept the at least one data collection in accordance with the specifications of the request for data and the one or more attributes of the at least one data collection;
receiving a command to accept the at least one data collection from the user;
generating an acceptance message in response to the received command;
sending the acceptance message to the at least one of the plurality of collecting devices; and
sending payment to each of the at least one of the plurality of collecting devices to which the acceptance message was sent.

27. A method comprising:
receiving a request for data associated with an upcoming event from a tasking device, the request for data including one or more specifications of data to be requested to collect data associated with the upcoming event and complying with the one or more specifications, the one or more specifications indicating a type of the data to be requested, a date and/or time for collecting the data to be requested, and a location of the upcoming event associated with the data to be requested;
displaying a user interface on the display, the user interface including 1) a map indicating a location of the received request for data 2) an icon or label, shown on the map, indicating the received request for data, and 3) one or more menu items indicating the one or more specifications of the data to be requested, wherein the map, the icon or label and the one or more menu items are displayed simultaneously on the user interface to enable a user to generate a bid in response to the request for data in accordance with the one or more specifications of the data to be requested;
sending the bid to the tasking device, the bid including a type of data to be collected, a location, a delivery date for delivering the data to be collected, and/or proposed payment for collecting the data;
collecting data complying with the one or more specifications by a sensor;
transmitting the collected data to the tasking device after the event has occurred;
receiving an acceptance message from the tasking device; and
receiving payment from the tasking device.

* * * * *